(12) United States Patent
Fujikawa et al.

(10) Patent No.: US 7,107,182 B2
(45) Date of Patent: Sep. 12, 2006

(54) PROGRAM AND PROCESS FOR GENERATING DATA USED IN SOFTWARE FUNCTION TEST

(75) Inventors: Ryoko Fujikawa, Kawasaki (JP); Goro Ito, Kawasaki (JP); Tetsuya Katayama, Oita (JP); Yasunobu Tominaga, Shizuoka (JP); Satoru Kawashima, Shizuoka (JP); Hitoshi Saito, Shizuoka (JP); Masanori Hasegawa, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 10/669,527

(22) Filed: Sep. 25, 2003

(65) Prior Publication Data

US 2004/0060039 A1    Mar. 25, 2004

(30) Foreign Application Priority Data

Sep. 25, 2002    (JP)    ............................. 2002-278806

(51) Int. Cl.
*G06F 11/30*    (2006.01)
(52) U.S. Cl. ...................... 702/182; 702/108; 702/109; 702/183
(58) Field of Classification Search ................ 702/108, 702/109, 182, 183, 185, 186; 717/124, 126, 717/131; 714/736
See application file for complete search history.

(56) References Cited

U.S. PATENT DOCUMENTS 6,502,210 B1 * 12/2002 Edwards ...................... 714/38

6,763,490 B1 * 7/2004 Krech et al. ................. 714/738

FOREIGN PATENT DOCUMENTS

| JP | 2000-267886 A | 9/2000 |
| JP | 2000-305812 | 11/2000 |
| JP | 2002-259160 A | 9/2002 |

OTHER PUBLICATIONS

English Language Abstract JP 06-250884 A dated Sep. 9, 1994.
Office Action issued Sep. 13, 2005 by the Japanese Patent Office regarding Application No.: 2002-278806.

* cited by examiner

*Primary Examiner*—John Barlow
*Assistant Examiner*—Stephen J. Cherry
(74) *Attorney, Agent, or Firm*—Staas & Halsey LLP

(57) ABSTRACT

A test support process and a test support program for producing a post-update test pattern when a program under test is updated. When a program under development is updated, a post-update operation description defining details of an operation of a function included in the program under development after the update is acquired. Next, a pre-update operation description having high commonality with the post-update operation description is selected from among pre-update operation descriptions defining details of operations of functions included in the program under development before the update. A pre-update test pattern for an operational test of the selected pre-update operation description is extracted from among pre-update test patterns prepared for operational tests of the program under development before the update. A post-update test pattern for an operational test of the post-update operation description is generated by inheriting at least a portion of the extracted pre-update test pattern.

13 Claims, 39 Drawing Sheets

```
public class Employee extends Super TestClass{{
    :
    // METHOD 1   FUNCTION OF SEARCHING FOR EMPLOYEE BASED
                  ON ENPLLOYEE NAME                         ~111a
    public EmployeeData searchEmployee(String  EmployeeName){
        :
    }
    // METHOD 2  FUNCTION OF SEARCHING FOR EMPLOYEE BASED ON NAME
                 AND AGE OF EMPLOYEE                        ~111b
    public EmployeeData searchEmployee(String EmployeeName,int age,int code){
        :
    }
    // METHOD 3   FUNCTION OF SEARCHING FOR EMPLOYEE BASED ON NAME,
                  AGE, AND SECTION CODE OF EMLOYEE          ~111c
    public EmployeeData searchEmployee(String EmployeeName,int Age,int code){
        :
    }
    // METHOD 4   FUNCTION OF SEARCHING FOR EMPLOYEE BASED ON
                  NAME AND SECTION CODE OF EMPLOYEE         ~111d
    public EmployeeData searchEmployee(String  EmployeeName,int code){
        :
    }
    // METHOD 5   FUNCTION OF UPDATING INFORMATION ON EMPLOYEE
                  BASED ON EMPLOYEE CODE                    ~111e
    public boolean updateEmployee(String  EmployeeName,int age,int code){
        :
    }
    // METHOD 6   FUNCTION OF DELETING INFORMATION ON EMPLOYEE
                  BASED ON EMPLOYEE CODE
    public int deleteEmployee(int EmployeeNo){~111f
        :
    }
}
```

| METHOD ID | CLASS NAME | METHOD NAME | RETURN VALUE NUMBER | PARAMETER NUMBER |
|---|---|---|---|---|
| 1 | Employee | searchEmployee | EmployeeData | 1 |
| 2 | Employee | searchEmployee | EmployeeData | 2 |
| 3 | Employee | searchEmployee | EmployeeData | 3 |
| 4 | Employee | searchEmployee | EmployeeData | 2 |
| 5 | Employee | updateEmployee | boolean | 3 |
| 6 | Employee | deleteEmployee | int | 1 |

131a

| PARAMETER ID | MEHOD ID | PARAMETER NAME | PARAMETER TYPE |
|---|---|---|---|
| 1 | 1 | EmployeeName | String |
| 2 | 2 | EmployeeName | String |
| 3 | 2 | age | int |
| 4 | 3 | EmployeeName | String |
| 5 | 3 | age | int |
| 6 | 3 | code | int |
| 7 | 4 | EmployeeName | String |
| 8 | 4 | code | int |
| 9 | 5 | EmployeeName | String |
| 10 | 5 | age | int |
| 11 | 5 | code | int |
| 12 | 6 | EmployeeNo | int |

| No | METHOD NAME | PARAMETER | NORMAL/ABNORMAL | RETURN VALUE | VIEWPOINT IN TEST |
|---|---|---|---|---|---|
| M1 | searchEmployee | EmployeeName | | Employee Data | |
| M1-1 | searchEmployee | "F-TSU, TARO" | NORMAL | SEARCH RESULT | TEST OF NORMAL SYSTEM |
| M1-2 | searchEmployee | "" | ABNORMAL | Null | ABNORMAL SYSTEM IN WHICH NAME IS BLANK |
| M1-3 | searchEmployee | Null | ABNORMAL | Null | ABNORMAL SYSTEM IN WHICH NAME IS NULL |

| No | METHOD NAME | PARAMETER | | NORMAL/ ABNORMAL | RETURN VALUE | VIEWPOINT OF TEST |
|---|---|---|---|---|---|---|
| | | EmployeeName | Age | | Employee Data | |
| M2 | searchEmployee | | | | | |
| M2-1 | searchEmployee | "F-TSU, TARO" | 29 | NORMAL | SEARCH RESULT | TEST OF NORMAL SYSTEM |
| M2-2 | searchEmployee | "" | 29 | ABNORMAL | Null | ABNORMAL SYSTEM IN WHICH NAME IS BLANK |
| M2-3 | searchEmployee | Null | 29 | ABNORMAL | Null | ABNORMAL SYSTEM IN WHICH NAME IS NULL |
| M2-4 | searchEmployee | "F-TSU, HANAKO" | 0 | ABNORMAL | Null | ABNORMAL SYSTEM IN WHICH AGE IS 0 |
| M2-5 | searchEmployee | F-TSU, HANAKO | 10 | ABNORMAL | Null | OUT OF RANGE OF EMPLOYEES' AGES |
| M2-6 | searchEmployee | "F-TSU, HANAKO" | 65 | ABNORMAL | Null | OUT OF RANGE OF EMPLOYEES' AGES |
| M2-7 | searchEmployee | "F-TSU, HANAKO" | Null | ABNORMAL | Null | AGE IS NULL |

| No | METHOD NAME | PARAMETER | | | NORMAL/ABNORMAL | RETURN VALUE | VIEWPOINT IN TEST |
|---|---|---|---|---|---|---|---|
| | | EmployeeName | Age | code | | | |
| M3 | searchEmployee | | | | | | |
| M3-1 | searchEmployee | "F-TSU TARO" | 29 | 12345 | NORMAL | SEARCH RESULT | TEST OF NORMAL SYSTEM |
| M3-2 | searchEmployee | "" | 29 | 12345 | ABNORMAL | Null | ABNORMA SYSTEM IN WHICH NAME IS BLANK |
| M3-3 | searchEmployee | Null | 29 | 12345 | ABNORMAL | Null | ABNORMAL SYSTEM IN WHICH NAME IS NULL |
| M3-4 | searchEmployee | | 0 | 12345 | ABNORMAL | Null | ABNORMAL SYSTEM IN WHICH AGE IS 0 |
| M3-5 | searchEmployee | "F-TSU, HANAKO" | 10 | 12345 | ABNORMAL | Null | OUT OF RANGE OF EMPLOYEES' AGES |
| M3-6 | searchEmployee | "F-TSU, HANAKO" | 65 | 12345 | ABNORMAL | Null | OUT OF RANGE OF EMPLOYEES' AGE |
| M3-7 | searchEmployee | "F-TSU, HANAKO" | Null | 12345 | ABNORMAL | Null | AGE IS NULL |
| M3-8 | searchEmployee | "F-TSU, HANAKO" | 29 | 0 | ABNORMAL | Null | EMPLOYEE CODE IS 0 |
| M3-9 | searchEmployee | "F-TSU, HANAKO" | 29 | Null | ABNORMAL | Null | EMPLOYEE CODE IS NULL |
| M3-10 | searchEmployee | Null | Null | Null | ABNORMAL | Null | NAME AND AGE ARE NULL |

FIG.12

| No | METHOD NAME | PARAMETER | | NORMAL/ ABNORMAL | RETURN VALUE | VIEWPOINT IN TEST |
|---|---|---|---|---|---|---|
| | | EmployeeName | code | | | |
| M4-1 | searchEmployee | "F–TSU, TARO" | 12345 | NORMAL | SEARCH RESULT | TEST OF NORMAL SYSTEM |
| M4-1 | searchEmployee | "" | 12345 | ABNORMAL | Null | ABNORMAL SYSTEM IN WHICH NAME IS BLANK |
| M4-2 | searchEmployee | Null | 12345 | ABNORMAL | Null | ABNORMAL SYSTEM IN WHICH NAME IS NULL |
| M4-3 | searchEmployee | "F–TSU, HANAKO" | 0 | ABNORMAL | Null | SECTION CODE IS 0 |
| M4-4 | searchEmployee | "F–TSU, HANAKO" | Null | ABNORMAL | Null | SECTION CODE IS NULL |
| M4-5 | searchEmployee | Null | Null | ABNORMAL | Null | NAME AND AGE ARE NULL |

| No | METHOD NAME | PARAMETER | | | NORMAL/ ABNORMAL | RETURN VALUE | VIEWPOINT IN TEST |
|---|---|---|---|---|---|---|---|
| | | EmployeeName | Age | code | | | |
| M5 | updateEmployee | | | | | | |
| M5-1 | updateEmployee | "F-TSU, TARO" | 29 | 12345 | NORMAL | SEARCH RESULT | TEST OF NORMAL SYSTEM |
| M5-2 | updateEmployee | "" | 29 | 12345 | ABNORMAL | Null | ABNORMAL SYSTEM IN WHICH NAME IS BLANK |
| M5-3 | updateEmployee | Null | 29 | 12345 | ABNORMAL | Null | ABNORMAL SYSTEM IN WHICH NAME IS NULL |
| M5-4 | updateEmployee | "F-TSU, HANAKO" | 0 | 12345 | ABNORMAL | Null | ABNORMAL SYSTEM IN WHICH AGE IS 0 |
| M5-5 | updateEmployee | "F-TSU, HANAKO" | 10 | 12345 | ABNORMAL | Null | OUT OF RANGE OF EMPLOYEES' AGES |
| M5-6 | updateEmployee | "F-TSU, HANAKO" | 65 | 12345 | ABNORMAL | Null | OUT OF RANGE OF EMPLOYEES' AGES |
| M5-7 | updateEmployee | "F-TSU, HANAKO" | Null | 12345 | ABNORMAL | Null | AGE IS NULL |
| M5-8 | updateEmployee | "F-TSU, HANAKO" | 29 | 0 | ABNORMAL | Null | EMPLOYEE CODE IS 0 |
| M5-9 | updateEmployee | "F-TSU, HANAKO" | 29 | Null | ABNORMAL | Null | EMPLOYEE CODE IS NULL |
| M5-10 | updateEmployee | Null | Null | Null | ABNORMAL | Null | EMPLOYEE CODE, NAME, AND AGE ARE NULL |

151e

| No | METHOD OF NAME | PARAMETER code | NORMAL/ ABNORMAL | RETURN VALUE | VIEWPOINT IN TEST |
|---|---|---|---|---|---|
| M6 | deleteEmployee | code | | Boolean | |
| M6-1 | deleteEmployee | 12345 | NORMAL | True | TEST OF NORMAL SYSTEM |
| M6-2 | deleteEmployee | 0 | ABNORMAL | False | ABNORMAL SYSTEM IN WHICH EMPLOYEE CODE IS 0 |
| M6-3 | deleteEmployee | Null | ABNORMAL | False | ABNORMAL SYSTEM IN WHICH EMPLOYEE CODE IS NULL |
| M6-4 | deleteEmployee | 11111 | ABNORMAL | False | ABNORMAL SYSTEM IN WHICH EMPLOYEE CODE IS NOT APPLICABLE |

```
public class Employee extends SuperTestClass{{
    // 1ST METHOD  FUNCTION OF SEARCHING FOR EMPLOYEE BASED ON EMPLOYEE NAME
                                                    ⌐112a
    private EmployeeData searchEmployee(String EmployeeName){
        :
    }
    // 2ND METHOD  FUNCTION OF SEARCHING FOR EMPLOYEE BASED ON NAME AND AGE OF
    EMPLOYEE                                        ⌐112b
    public EmployeeData[ ] searchEmployee(String EmployeeName,int age,){
        :
    }
    // 3RD METHOD  FUNCTION OF SEARCHING FOR EMPLOYEE BASED ON NAME, AGE,
    AND SECTION CODE OF EMPLOYEE                    ⌐112c
    public EmployeeData searchEmployee(String EmployeeName,long Age,int
    section,Boolean retire){
        :
    }
    // 4TH METHOD  FUNCTION OF SEARCHING FOR EMPLOYEE BASED ON NAME AND
    SECTION CODE OF EMPLOYEE                        ⌐112d
    public EmployeeData[ ] searchEmployee(String EmployeeName,int section){
        :
    }
    // 5TH METHOD  FUNCTION OF UPDATING INFORMATION ON EMPLOYEE BASED ON
    EMPLOYEE CODE                                   ⌐112e
    public boolean updateEmployeebyNo(String EmployeeName,int age,int code){
        :
    }
    // 6TH METHOD  FUNCTION OF DELETING INFORMATION ON EMPLOYEE BASED ON
    EMPLOYEE CODE                                   ⌐112f
    public int deleteEmployeebyNo(int EmployeeNo,StringEmployeeName){
        :
    }
}
```

FIG. 16

| METHOD ID | CLASS NAME | METHOD NAME | RETURN VALUE TYPE | PARAMETER NUMBER |
|---|---|---|---|---|
| 1 | Employee | searchEmployee | EmployeeData | 1 |
| 2 | Employee | searchEmployee | EmployeeData[ ] | 2 |
| 3 | Employee | searchEmployee | EmployeeData | 4 |
| 4 | Employee | searchEmployee | EmployeeData[ ] | 2 |
| 5 | Employee | updateEmployeebyNo | Boolean | 3 |
| 6 | Employee | deleteEmployeebyNo | int | 1 |

| PARAMETER ID | METHOD ID | PARAMETER NAME | PARAMETER TYPE |
|---|---|---|---|
| 1 | 1 | EmployeeName | String |
| 2 | 2 | EmployeeName | String |
| 3 | 2 | Age | int |
| 4 | 3 | EmployeeName | String |
| 5 | 3 | Age | Long |
| 6 | 3 | Section | int |
| 7 | 3 | Retire | Boolean |
| 8 | 4 | EmployeeName | String |
| 9 | 4 | Section | int |
| 10 | 5 | EmployeeName | String |
| 11 | 5 | Age | int |
| 12 | 5 | Code | int |
| 13 | 6 | EmployeeNo | int |
| 14 | 6 | EmployeeName | String |

161b

| | METHOD NAME | PARAMETER | RETURN VALUE |
|---|---|---|---|
| 1ST DETERMINATION | ○ | ○ | ○ |
| 2ND DETERMINATION | ○ | ○ | × |
| 3RD DETERMINATION | ○ | × | ○ |
| 4TH DETERMINATION | × | × | × |
| 5TH DETERMINATION | × | ○ | ○ |

FIG. 22

| NAME OF EXAMPLE | DETERMINATION | INHERITED TEST CASE | UNINHERITED TEST CASE |
|---|---|---|---|
| 1ST METHOD | 1ST DETERMINATION: COMPLETE MATCH IN THREE ATTRIBUTES | M1-1~M1-3 | NONE |
| 2ND METHOD | 2ND DETERMINATION: MISMATCH IN RETURN VALUE | M2-1~M2-7 | NONE |
| 3RD METHOD | 3RD DETERMINATION: MISMATCH IN PARAMETER | M3-1~M3-10 | NONE |
| 4TH METHOD | 4TH DETERMINATION: MISMATCH IN PARAMETER AND RETURN VALUE | M4-1~M4-6 | NONE |
| FIFTH METHOD | 5TH DETERMINATION: MISMATCH IN PARAMETER NAME | M5-1~M5-10 | NONE |
| 6TH METHOD | UNINHERITABLE BASE ON THE DETERMINATIONS | NONE | M6-1~M6-4 |

FIG. 23

|  | METHOD NAME | PARAMETER | RETURN VALUE | OTHERS |
|---|---|---|---|---|
| BEFORE CHANGE | searchEmoployee | String EmployeeName, int Age | EmployeeData | public |
| AFTER CHANGE | searchEmoployee | String EmployeeName, int Age | EmployeeData | private |

FIG. 25

```
public  EmployeeData   searchEmployee( String EmployeeName,int  Age )    ─ 111b
         ↓ CHANGE
public  EmployeeData[ ]  searchEmployee( String EmployeeName,int  Age )  ─ 112b
```

FIG. 26

|  | METHOD NAME | PARAMETER | RETURN VALUE | OTHERS |
|---|---|---|---|---|
| BEFORE CHANGE | searchEmoployee | String EmployeeName, int Age | EmployeeData | Public |
| AFTER CHANGE | searchEmoployee | String EmployeeName, int Age | EmployeeData[ ] | public |

FIG. 27

↓ SET DEFAULT VALUE (NULL)    152b

| No | METHOD NAME | PARAMETER | | NORMAL/ ABNORMAL | RETURN VALUE | VIEWPOINT IN TEST |
|---|---|---|---|---|---|---|
| | | EmployeeName | Age | | Employee Data[ ] | |
| M2-1 | searchEmployee | "F-TSU, TARO" | 29 | NORMAL | SEARCH RESULT | TEST OF NORMAL SYSTEM |
| M2-2 | searchEmployee | "" | 29 | ABNORMAL | Null | ABNORMAL SYSTEM IN WHICH NAME IS BLANK |
| M2-3 | searchEmployee | Null | 29 | ABNORMAL | Null | ABNORMAL SYSTEM IN WHICH NAME IS NULL |
| M2-4 | searchEmployee | "F-TSU, HANAKO" | 0 | ABNORMAL | Null | ABNORMAL SYSTEM IN WHICH AGE IS 0 |
| M2-5 | searchEmployee | "F-TSU, HANAKO" | 10 | ABNORMAL | Null | OUT OF RANGE OF EMPLOYEES' AGES |
| M2-6 | searchEmployee | "F-TSU, HANAKO" | 65 | ABNORMAL | Null | OUT OF RANGE OF EMPLOYEES' AGES |
| M2-7 | searchEmployee | "F-TSU, HANAKO" | Null | ABNORMAL | Null | AGE IS NULL |

FIG. 28

```
public  EmployeeData   searchEmployee( String EmployeeName,int Age,int code )       ─┐ 111c
                                         ↓ CHANGE
public  EmployeeData   searchEmployee( String EmployeeName,long Age ,int section,   ─┐ 112c
boolean retire )
```

FIG. 29

| | METHOD NAME | PARAMETER | RETURN VALUE | OTHERS |
|---|---|---|---|---|
| BEFORE CHANGE | searchEmoployee | String EmployeeName, int Age, int code | EmployeeData | Public |
| AFTER CHANGE | searchEmoployee | StringEmployeeName, long Age,int section, boolean retire | EmployeeData | Public |

FIG. 30

| No. | METHOD PARAMETER | | | | | ABNORMAL/ NORMAL | RETURN VALUE | VIEWPOINT IN TEST |
|---|---|---|---|---|---|---|---|---|
| | EmployeeName (String) | Age (int) | Code(int) | | | | | |
| BEFORE CHANGE | ①MATCH IN BOTH | ②MACHI IN NAME | ③MATCH IN TYPE | NONE | | | | |
| DETERMI- NATION | | | | ④MISMATCH GENERATION OF DEFAULT | | | | |
| AFTER CHANGE | EmployeeName (String) | Age (long) | Section (int) | | Retire (Boolean) | | | |
| M3-1 | "F-TSU, TARO" | 29 | 12345 | | true | NORMAL | SEARCH RESULT | TEST OF NORMAL SYSTEM |
| M3-2 | "" | 29 | 12345 | | | ABNORMAL | Null | ABNORMAL SYSTEM IN WHICH NAME IS BLANK |
| M3-3 | Null | 29 | 12345 | | | ABNORMAL | Null | ABNORMAL SYSTEM IN WHICH NAME IS NULL |
| M3-4 | "F-TSU, HANAKO" | 0 | 12345 | | | ABNORMAL | Null | ABNORAL SYSTEM IN WHICH AGE IS 0 |
| M3-5 | "F-TSU, HANAKO" | 10 | 12345 | | | ABNORMAL | Null | OUT OF RANGE OF EMPLOYEES' AGES |
| M3-6 | "F-TSU, HANAKO" | 65 | 12345 | | | ABNORMAL | Null | OUT OF RANGE OF EMPLOYEES' AGES |
| M3-7 | "F-TSU, HANAKO" | Null | 12345 | | | ABNORMAL | Null | AGE IS NULL |
| M3-8 | "F-TSU, HANAKO" | 29 | 0 | | | ABNORMAL | Null | SECTION CODE IS 0 |
| M3-9 | "F-TSU, HANAKO" | 29 | Null | | | ABNORMAL | Null | SECTION CODE IS NULL |
| M3-10 | Null | Null0 | | | | ABNORMAL | Null | NAME AND AGE ARE NULL |

FIG. 31

```
public EmployeeData   searchEmployee( String EmployeeName,int code )    ⎱ 111d
        ↓ CHANGE                                            ↓ CHANGE
public EmployeeData[] searchEmployee( String EmployeeName,int section ) ⎱ 112d
```

FIG. 32

|  | METHOD NAME | PARAMETER | RETURN VALUE | OTHERS |
|---|---|---|---|---|
| BEFORE CHANGE | searchEmoployee | String EmployeeName, int code | EmployeeData | Public |
| AFTER CHANGE | searchEmoployee | String EmployeeName, int section | EmployeeData[ ] | Public |

| No | METHOD PARAMETER | | NORMAL/ABNORMAL | RETURN VALUE | VIEWPOINT IN TEST |
|---|---|---|---|---|---|
| BEFORE CHANGE | EmployeeName (String) | | | EmployeeData | |
| DETERMINATION | ①MATCH IN BOTH | ③MATCH IN TYPE | | | |
| AFTER CHANGE | EmployeeName (String) | Section (int) | | EmployeeData [ ] | |
| M4-1 | "F-TSU, TARO" | 12345 | NORMAL | Null | TEST OF NORMAL SYSTEM |
| M4-2 | " " | 12345 | ABNORMAL | Null | ABNORMAL SYSTEM IN WHICH NAME IS BLANK |
| M4-3 | Null | 12345 | ABNORMAL | Null | ABNORMAL SYSTEM IN WHICH NAME IS NULL |
| M4-4 | "F-TSU, HANAKO" | 0 | ABNORMAL | Null | SECTION CODE IS 0 |
| M4-9 | "F-TSU, HANAKO" | Null | ABNORMAL | Null | SECTION CODE IS NULL |
| M4-6 | Null | Null | ABNORMAL | Null | NAME AND AGE ARE NULL |

FIG. 34

|  | METHOD NAME | PARAMETER | RETURN VALUE | OTHERS |
|---|---|---|---|---|
| BEFORE CHANGE | updateEmoployee | String EmployeeName, long Age, int code | EmployeeData | Public |
| AFTER CHANGE | updateEmployeebyNo | String EmployeeName, long Age, int code | EmployeeData | Public |

FIG. 36

| No | METHOD NAME | PARAMETER | | | NORMAL/ ABNORMAL | RETURN VALUE | VIEWPOINT IN TEST |
|---|---|---|---|---|---|---|---|
| | | EmployeeName | Age | code | | | |
| M5-1 | updateEmployeebyNo | "F-TSU, TARO" | 29 | 12345 | NORMAL | SEARCH RESULT | TEST OF NORMAL SYSTEM |
| M5-2 | updateEmployeebyNo | "" | 29 | 12345 | ABNORMAL | Null | ABNORMAL SYSTEM IN WHICH NAME IS BLANK |
| M5-3 | updateEmployeebyNo | Null | 29 | 12345 | ABNORMAL | Null | ABNORMAL SYSTEM IN WHICH NAME IS NULL |
| M5-4 | updateEmployeebyNo | "F-TSU, HANAKO" | 0 | 12345 | ABNORMAL | Null | ABNORMAL SYSTEM IN WHICH AGE IS 0 |
| M5-5 | updateEmployeebyNo | "F-TSU, HANAKO" | 10 | 12345 | ABNORMAL | Null | OUT OF RANGE OF EMPLOYEES' AGES |
| M5-6 | updateEmployeebyNo | "F-TSU, HANAKO" | 65 | 12345 | ABNORMAL | Null | OUT OF RANE OF EMPLOYEES' AGES |
| M5-7 | updateEmployeebyNo | "F-TSU, HANAKO" | Null | 12345 | ABNORMAL | Null | AGE IS NULL |
| M5-8 | updateEmployeebyNo | "F-TSU, HANAKO" | 29 | 0 | ABNORMAL | Null | EMPLOYEE CODE IS 0 |
| M5-9 | updateEmployeebyNo | "F-TSU, HANAKO" | 29 | Null | ABNORMAL | Null | EMPLOYEE CODE IS NULL |
| M5-10 | updateEmployeebyNo | Null | Null | Null | ABNORMAL | Null | EMPLOYEE CODE, NAME, AND AGE ARE NULL |

FIG. 37

CONFIRMATION OF METHOD INHERITANCE

TestSrc_01.java is updated. Please assign a method, and confirm a method to be inherited.

METHOD INFORMATION AFTER UPDATE(T): — 210

| CLASS NAME (NEW) | METHOD NAME (NEW) |
|---|---|
| AAA | MethodA10 |
| AAA | MethodA20 |
| AAA | MethodA30 |
| AAA | MethodA40 |
| AAA | MethodA50 |
| AAA | MethodA60 |
| AAA | MethodA70 |
| AAA | MethodA80 |
| AAA | MethodA90 |
| AAA | MethodAA0 |

METHOD INFORMATION BEFORE UPDATE(F): — 220

| CLASS NAME (NEW) | METHOD NAME (NEW & OLD) | FILE NAME (OLD) |
|---|---|---|
| AAA | MethodA10 | TestSrc_03.java |
| AAA | MethodA2(int A) | TestSrc_03.java |
| AAA | MethodA3(int B) | TestSrc_02.java |

- UP(U) — 201
- DOWN(L) — 202
- DELETE(D) — 203

UNINHERITED-METHOD LIST(M): — 230

| CLASS NAME | METHOD NAME | FILE NAME |
|---|---|---|
| AAA | MethodB10 | TestSrc_1.java |

ADDITION (A) — 204

Please choose from the "Uninherited-method List" (indicated on the right side) a method as an object to be inherited, and register the chosen method in the list of "Method Information Before Update" (indicated at the upper right).

OK — 205   CANCEL — 206   HELP — 207

FIG. 38

TEST CASE EDITING-CLASS1::METHOD1(PureJava APPLICATION):1 — 300, 310

TEST CASE

| TEST CASE NUMBER | DETAILES OF TEST | NORMAL/ ABNORMAL | EDUCATION METHOD | TYPE OF FACTOR ON WHICH ATTENTION IS FOCUSED | METHOD PARAMETER NAME | VARIABLE NAME |
|---|---|---|---|---|---|---|
| Method1 | | | | | | |
| Method1_001 | DETAILES OF TEST | NORMAL | .... OF TEST | param1 | | |
| Method1_002 | DETAILES OF TEST | NORMAL | . | param3 | | |
| Method1_003 | DETAILES OF TEST | NORMAL | . | param2 | | |

PARAMETER DATA / VARIABLE DATA — 320

| PARAMETER | ATTRIBUTE | VALUE |
|---|---|---|
| param1 | int | 10 |
| param2 | MyClass | — |
| field1 | int[ ] | — |
| bbb | ArrayList | |
| tblField | hashmap | |
| param3 | boolean | false |

FIG. 39

PROGRAM AND PROCESS FOR GENERATING DATA USED IN SOFTWARE FUNCTION TEST

BACKGROUND OF THE INVENTION

1) Field of the Invention

The present invention relates to a test support program and a test support process for supporting an operational test which is performed for verifying a function of software under development. In particular, the present invention relates to a test support program and a test support process for supporting generation of a test pattern which is used in a test, where the test pattern contains at least one parameter to be inputted to a function and a return value to be returned from the function.

2) Description of the Related Art

In development of large-scale software, it is impossible to produce a program which contains no bug, from the beginning. Therefore, in order to develop software, it is necessary to check that a produced program operates as designed. When bugs are found by a test during development, and the program is appropriately corrected, it is possible to develop software which correctly operates as designed.

For example, in programs produced in an object-oriented manner, a method is produced for each function. Each method executes predetermined processing according to inputted data, and outputs a return value. Therefore, when an object-oriented program is tested, a test pattern including data to be inputted to each method and a return value to be outputted in correspondence with the inputted data is produced. It is possible to verify whether or not the program correctly operates, based on whether or not each method outputs an identical value as the test pattern in response to each input when the method is executed.

However, in software development, a great amount of man-hours are needed for testing. In particular, in the case where importance is placed on quality, sometimes the man-hour ratio between programming and program testing becomes 2:8.

Increase in the efficiency in the program testing is a great challenge to software development. In order to increase the efficiency of the program testing, test support tools have been developed. One of known test support tools, which is disclosed in, for example, Japanese Unexamined Patent Publication No. 6-250884, automatically generates a driver, a stub, and a command string for debugger control.

The driver is a module for calling a module to be tested, the stub is a module for duplicating an operation of a module subordinate to the module to be tested, and the command string for debugger control specifies at least one location at which input data as at least one variable is to be set and at least one field which is actually used in an executable statement, and prompts setting of the input data and confirmation of a result, where the at least one variable is necessary for execution of the module to be tested.

However, the test support tools can generate only minimal test patterns necessary for testing. Therefore, in order to perform a test with high reliability, it is necessary to additionally prepare test patterns containing various combinations of parameters and return values according to information which is assumed to represent functions of software and objects to be processed. In this case, operators are required to manually input the additionally prepared test patterns in accordance with the functions of the software as appropriate.

Further, when a program test is performed with high reliability, a great number of troubles (for example, with an average rate of 10 troubles/Ksteps, i.e., ten troubles in a thousand steps) are detected, and the troubles are corrected or specification is changed according to the troubles. Therefore, operations for changing test patterns in accordance with the program changes are frequently performed.

As explained above, conventionally, every time a software program under development is changed, a bothersome operation for changing test patterns is performed. Thus, enormous efforts have been expended for production of test patterns. Further, even when the test support tools are used, the work load of the production of test patterns cannot be reduced. Thus, the impossibility of reduction of the work load of the production of test patterns impedes use of the test support tools.

SUMMARY OF THE INVENTION

The present invention is made in view of the above problems, and the object of the present invention is to provide a test support program and a test support process which can efficiently produce a test pattern for an updated program to be tested, at the time of the update.

In order to accomplish the above object, there is provided a test support program executed by a computer for performing an operational test of a program under development by using test patterns each of which includes a parameter to be inputted to a function defined in the program under development and a return value to be outputted from the function. The test support program makes said computer perform processing comprising the steps of: (a) acquiring a post-update operation description which defines details of an operation of a function included in the program under development after an update when the program under development undergoes the update; (b) selecting a pre-update operation description which has high commonality with the post-update operation description acquired in step (a), from among a plurality of pre-update operation descriptions defining details of operations of functions included in the program under development before the update; (c) extracting a pre-update test pattern for an operational test of the pre-update operation description selected in step (b), from among a plurality of pre-update test patterns prepared for operational tests of the program under development before the update; and (d) generating a post-update test pattern for an operational test of the post-update operation description acquired in step (a), by inheriting at least a portion of the pre-update test pattern extracted in step (c).

In addition, in order to accomplish the above object, there is provided a test support process for performing an operational test of a program under development by using test patterns each of which includes a parameter to be inputted to a function defined in the program and a return value to be outputted from the function. The test support process comprises the steps of: (a) acquiring a post-update operation description which defines details of an operation of a function included in the program after an update, when the program undergoes the update; (b) selecting a pre-update operation description which has high commonality with the post-update operation description acquired in step (a), from among a plurality of pre-update operation descriptions defining details of operations of functions included in the program before the update; (c) extracting a pre-update test pattern for an operational test of the pre-update operation description selected in step (b), from among a plurality of pre-update test patterns prepared for operational tests of the program before the update; and (d) generating a post-update test pattern for an operational test of the post-update operation description acquired in step (a), by inheriting at least a portion of the pre-update test pattern extracted in step (c).

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 7 is a diagram illustrating an example of a test class before an update;

FIG. 9 is a diagram illustrating an example of a method parameter table before the update;

FIG. 10 is a diagram illustrating examples of test patterns for a first method before a change of the test class;

FIG. 11 is a diagram illustrating examples of test patterns for a second method before the change of the test class;

FIG. 12 is a diagram illustrating examples of test patterns for a third method before the change of the test class;

FIG. 13 is a diagram illustrating examples of test patterns for a fourth method before the change of the test class;

FIG. 14 is a diagram illustrating examples of test patterns for a fifth method before the change of the test class;

FIG. 15 is a diagram illustrating examples of test patterns for a sixth method before the change of the test class;

FIG. 16 is a diagram illustrating an example of the test class after the update;

FIG. 17 is a diagram illustrating an example of a method information table after the update;

FIG. 22 is a diagram indicating relationships between determinations and attributes of a method;

FIG. 23 is a diagram illustrating examples of results of automatic determinations of test patterns according to changes of methods;

FIG. 25 is a diagram illustrating a comparison result for each attribute of the first method;

FIG. 26 is a diagram illustrating details of correction of the second method;

FIG. 27 is a diagram illustrating a comparison result for each attribute of the second method;

FIG. 28 is a diagram illustrating examples of test patterns for the second method after the update;

FIG. 29 is a diagram illustrating details of correction of the third method;

FIG. 30 is a diagram illustrating a comparison result for each attribute of the third method;

FIG. 31 is a diagram illustrating examples of test patterns for the third method after the update;

FIG. 32 is a diagram illustrating details of correction of the fourth method;

FIG. 33 is a diagram illustrating a comparison result for each attribute of the fourth method;

FIG. 34 is a diagram illustrating examples of test patterns for the fourth method after the update;

FIG. 36 is a diagram illustrating a comparison result for each attribute of the fifth method;

FIG. 37 is a diagram illustrating examples of test patterns for the fifth method after the update;

FIG. 38 is a diagram illustrating an example of a screen for designating a method to be inherited; and FIG. 39 is a diagram illustrating an example of a screen for confirming a result of inheritance of test patterns.

DESCRIPTION OF THE PREFERRED EMBODIMENTS

An embodiment of the present invention is explained below with reference to drawings.

First, an outline of the invention which is realized in the embodiment is explained, and thereafter details of the embodiment are explained.

Figure 1:
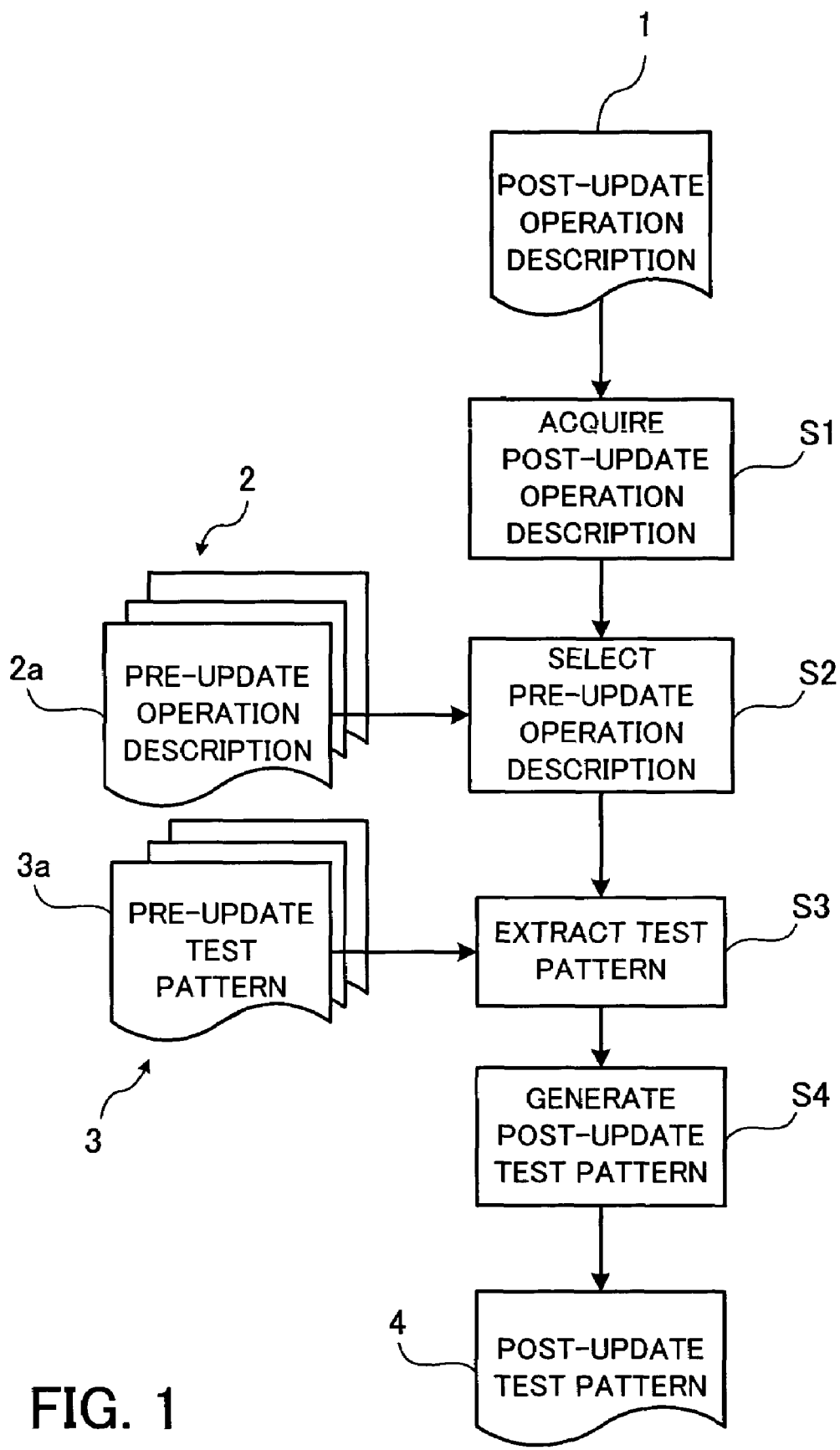
FIG. 1 is a conceptual diagram illustrating the present invention which is realized in an embodiment.

FIG. 1 is a conceptual diagram illustrating the invention which is realized in the embodiment. According to the present invention, an operational test of a program under development is performed by using a test pattern containing a parameter to be inputted to a function defined in the program under development and a return value to be outputted from the function.

In order to perform the operational test, when the program under development is updated, first, a post-update operation description 1 is obtained (in step S), where the post-update operation description 1 defines details of an operation realizing a function included in the program under development after the update (i.e., the program under development which has undergone the update). The post-update operation description 1 can be obtained, for example, by analyzing details of the program under development after the update. When a plurality of functions are included in the program under development after the update, a plurality of post-update operation descriptions 1 respectively corresponding to the plurality of functions are generated.

Next, a pre-update operation description 2a having high commonality with the post-update operation description 1 is selected from among a plurality of pre-update operation descriptions 2 (in step S2), which define details of operations realizing a plurality of functions included in the program under development before the update (i.e., the program under development which has not yet undergone the update). The pre-update operation descriptions 2 can be obtained, for example, by analyzing details of the program under development before the update.

Subsequently, a pre-update test pattern 3a for an operational test of the pre-update operation description 2a selected in step S2 is extracted from among a plurality of pre-update test patterns 3 (in step S3), which are produced for operational tests of the program under development before the update.

Then, a post-update test pattern 4 for an operational test of the post-update operation description 1 is generated by inheriting at least a portion of the extracted pre-update test pattern 3a (in step S4).

Thus, the post-update test pattern 4 corresponding to the post-update operation description 1 is generated by inheriting the information in the pre-update test pattern 3a which is set for the pre-update operation description 2a having high commonality with the post-update operation description 1. Therefore, it is unnecessary to remake the test pattern from the beginning even when the program under development is updated, and thus it is easy to produce the test pattern. Since the test pattern can be easily produced, the operational test can be efficiently performed by using the test support program.

Hereinbelow, an embodiment of the present invention is explained in detail. In the following embodiment, an example of a test support apparatus is provided, where attention is focused on functions (methods) in a class defined in an object-oriented language, and the test support apparatus performs a test of software produced in an object-oriented manner. When the present invention is applied to software development in an object-oriented manner, it is possible to increase productivity of software programs written in an object-oriented language.

In the case where software is developed in an object-oriented language, when a function in a class which is to be tested is changed, a test pattern which has been already designed is inherited by a test pattern corresponding to the method after the change. Since the mostly used object-oriented languages are Java (registered trademark) and C++, Java is used as an example in the test support apparatus in the embodiment explained below.

In the case of the object-oriented languages, each function (method) behaves differently depending on an input pattern of at least one method parameter value. In a test support tool, various input test patterns of the at least one parameter value are designed, where the at least one parameter value is required to be specified when the method is called. A test can be performed by calling the method and using the input test patterns.

Incidentally, during software development in an object-oriented language, interface specifications of methods change many times due to changes in class specifications, necessities of countermeasures to troubles, and the like. When the interface specifications of methods change, test patterns (parameter values in method calling) which have already been defined become useless, and the efficiency in testing decrease. Therefore, in order to prevent the decrease in the efficiency, the test support apparatus explained below realizes a mechanism for automatically inheriting at least one test pattern for at least one method when class specifications change.

In the following embodiment, attention is focused on attributes of an interface of a function (method), and first and second mechanisms are provided, where the first mechanism automatically makes a determination whether or not an old function is changed to a new function, based on a predetermined rule, and inheriting a test pattern, and the second mechanism provides an inheritable test pattern to a user when the determination is impossible. For example, the interfaces on which attention is focused are "method name (name of function)," "method parameter (operational condition of function)," and "method return value (result of function)." A priority is assigned to each attribute on which attention is focused. A correspondence between a pre-change method and a post-change method is automatically established in accordance with a rule based on a priority assigned to a matching attribute, and automatic inheritance of a test pattern is realized.

First, a hardware construction of the test support apparatus is explained below.

Figure 2:
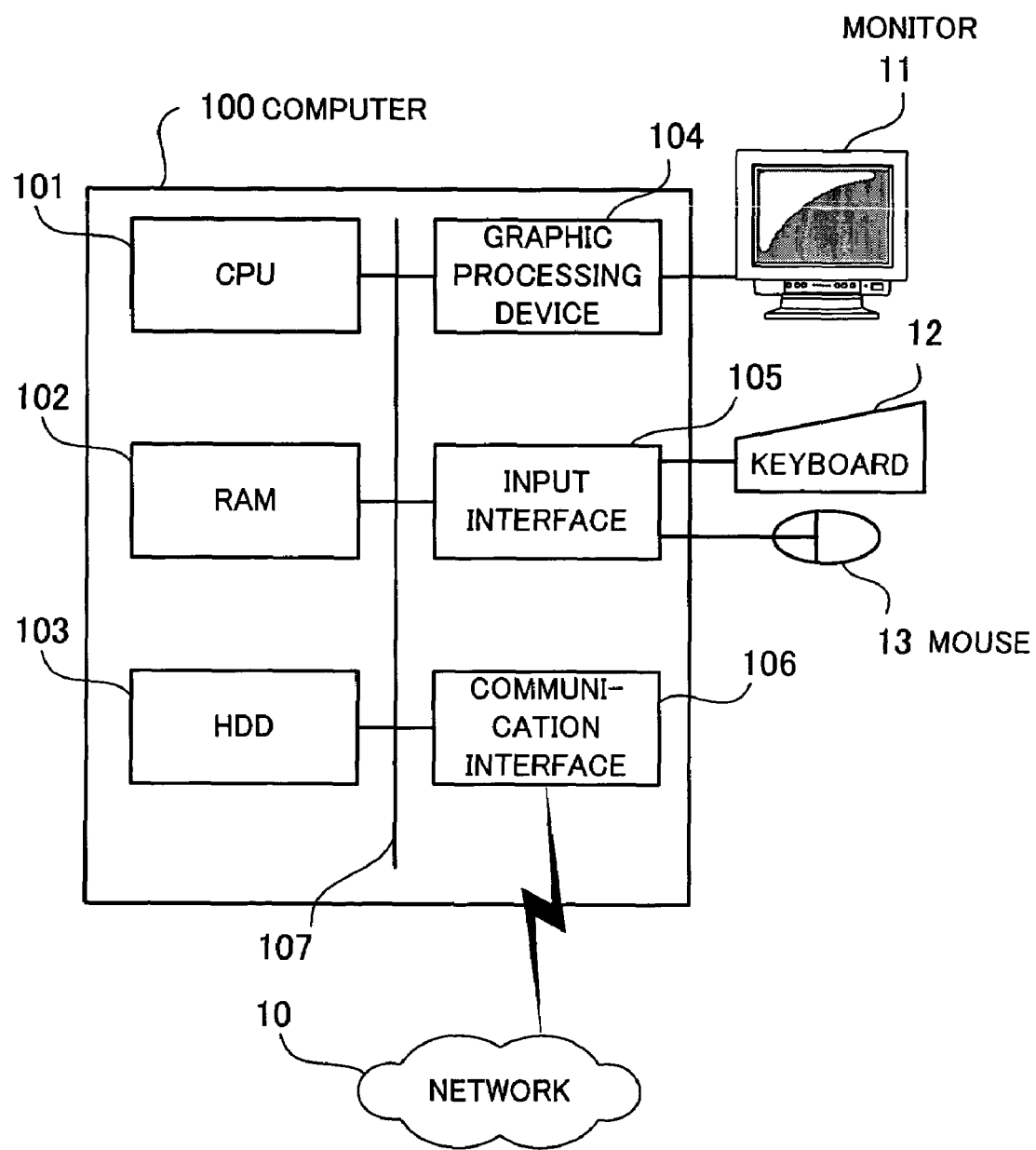
FIG. 2 is a diagram illustrating an example of a hardware construction of a computer used in the embodiment of the present invention.

FIG. 2 is a diagram illustrating a hardware construction of the test support process used in the embodiment of the present invention. The entire system of the test support process 100 is controlled by a CPU (central processing unit) 101, to which a RAM (random access memory) 102, an HDD (hard disk drive) 103, a graphic processing device 104, an input interface 105, and a communication interface 106 are connected through a bus 107.

The RAM 102 temporarily stores at least a portion of an OS (operating system) program and application programs which are executed by the CPU 101, as well as various types of data necessary for processing by the CPU 101. The HDD 103 stores the OS program and the application programs.

A monitor 11 is connected to the graphic processing device 104, which makes the monitor 11 display an image on a screen in accordance with an instruction from the CPU 101. A keyboard 12 and a mouse 13 are connected to the input interface 105, which transmits signals transmitted from the keyboard 12 and the mouse 13, to the CPU 101 through the bus 107.

The communication interface 106 is connected to a network 10. The communication interface 106 is provided for exchanging data with other test support apparatuses through the network 10.

By using the above hardware construction, functions of the test support apparatus in the present embodiment can be realized.

Figure 3:
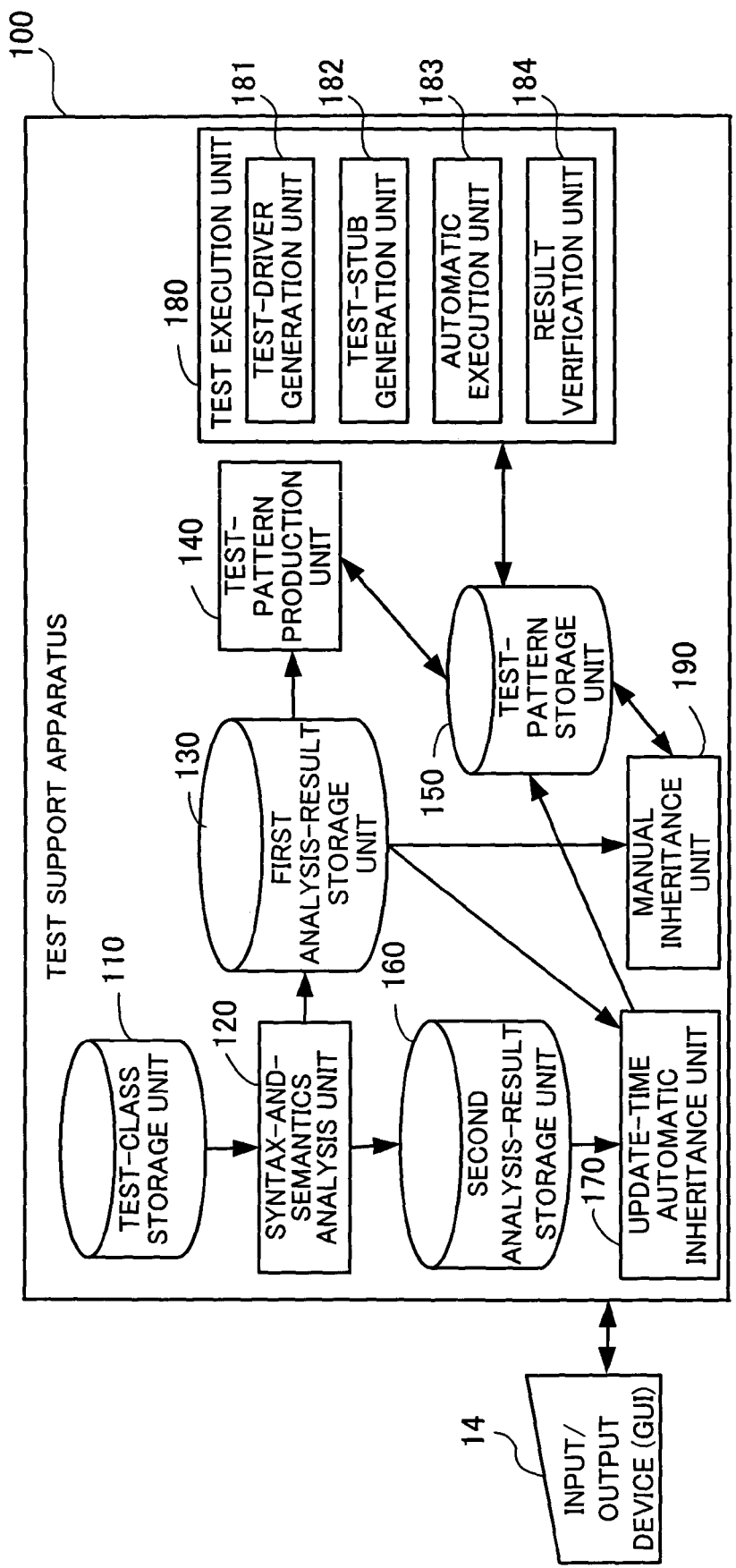
FIG. 3 is a block diagram illustrating processing functions which a test support apparatus should have.

FIG. 3 is a block diagram illustrating processing functions which the test support apparatus has. As illustrated in FIG. 3, the test support apparatus 100 comprises a test-class storage unit 110, a syntax-and-semantics analysis unit 120, a first analysis-result storage unit 130, a test-pattern production unit 140, a test-pattern storage unit 150, a second analysis-result storage unit 160, an update-time automatic inheritance unit 170, a test execution unit 180, and a manual inheritance unit 190. In addition, input/output devices 14 such as the monitor 11 and the keyboard 12 are connected to the test support apparatus 100.

The test-class storage unit 110 stores at least one class (test class) which is to be tested. Each class is a set of instances (objects) having a common attribute (feature). Each class can be deemed to be a template based on which each instance is defined. In other words, in each class, a set of attribute items and a set of procedures which all instances of the class commonly have are collectively described.

The syntax-and-semantics analysis unit 120 analyzes syntax and semantics of a test class, and generates analysis-result information indicating a result of the analysis of the test class. The syntax-and-semantics analysis unit 120 is also called parser. The syntax-and-semantics analysis unit 120 stores in the first analysis-result storage unit 130 analysis-result information for a test class which is newly produced. In addition, the syntax-and-semantics analysis unit 120 also stores in the second analysis-result storage unit 160 analysis-result information for a test class which is updated.

The first analysis-result storage unit 130 stores analysis-result information for a test class which is newly produced.

The test-pattern production unit 140 produces a test pattern based on the analysis-result information stored in the first analysis-result storage unit 130, and stores the produced test pattern in the test-pattern storage unit 150.

The test-pattern storage unit 150 stores at least one test pattern produced by the test-pattern production unit 140 and at least one other test pattern which has been inherited by the operations of the update-time automatic inheritance unit 170 or the manual inheritance unit 190.

The second analysis-result storage unit 160 stores analysis-result information for a test class which is changed from an existing test class.

The update-time automatic inheritance unit 170 produces a test pattern according to the analysis-result information in the second analysis-result storage unit 160, by using as a base a test pattern stored in the test-pattern storage unit 150, and stores the produced test pattern in the test-pattern storage unit 150.

The test execution unit 180 performs an operational test of a test class stored in the test-class storage unit 110, based on a test pattern stored in the test-pattern storage unit 150.

Specifically, the test execution unit 180 comprises a test-driver generation unit 181, a test-stub generation unit 182, an automatic execution unit 183, and a result verification unit 184. The test-driver generation unit 181 generates a test driver, which is a program module for calling a module to be tested. The test-stub generation unit 182 generates a test stub, which is a program for duplicating a dummy operation of a class having a structure subordinate to a test class to be tested. The automatic execution unit 183 executes a test of the test class by using the test-driver, the test stub, test patterns, and the like.

In response to a manipulation input, the manual inheritance unit 190 makes a test pattern for post-update test class inherit at least a portion of a test pattern for a newly produced test class.

According to the above construction, automatic inheritance of a test pattern is enabled.

Figure 4:
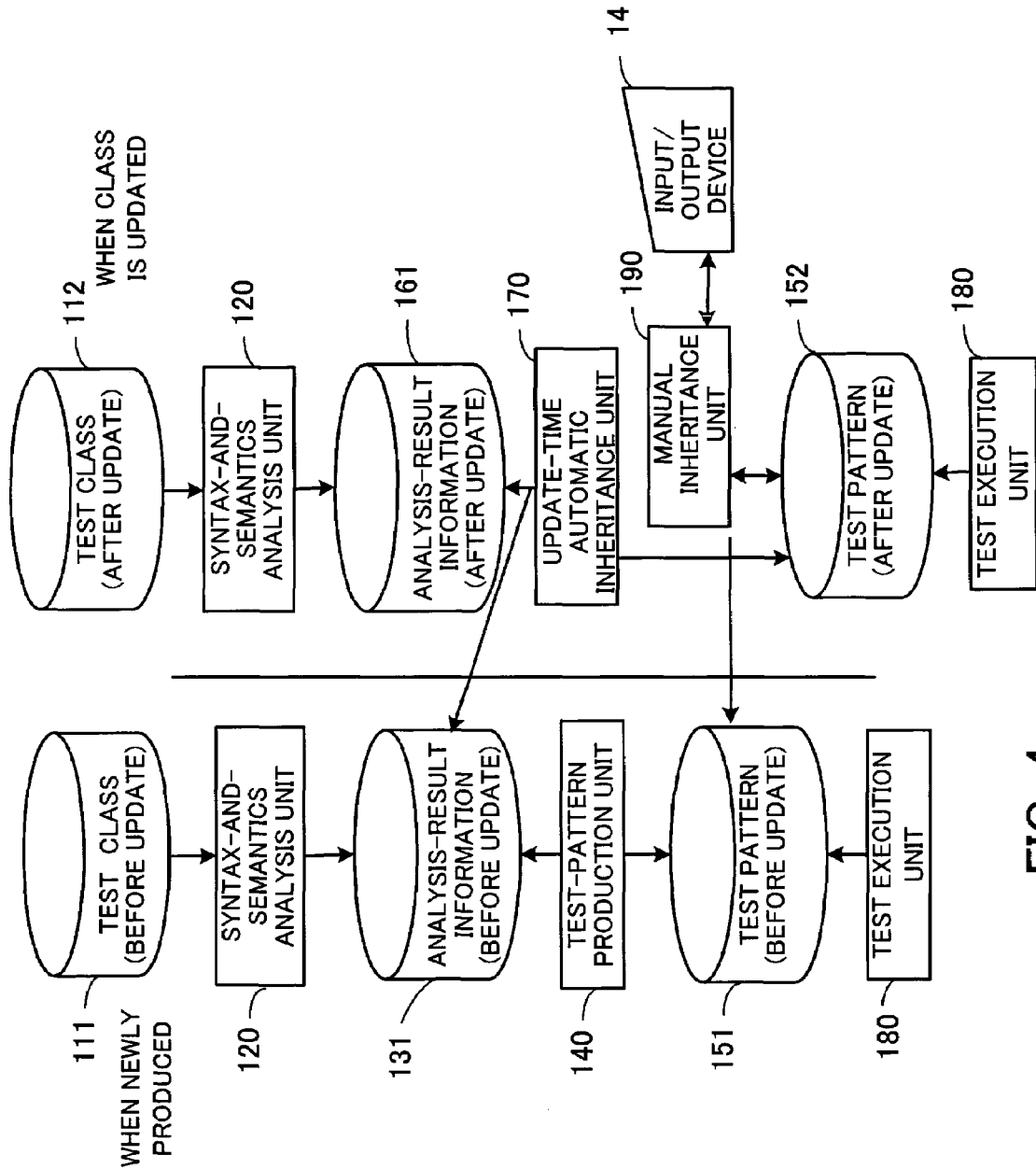
FIG. 4 is a diagram illustrating input-output relationships for automatic inheritance of test patterns.

FIG. 4 is a diagram illustrating input-output relationships for automatic inheritance of test patterns. A pre-update test class 111 is inputted into the syntax-and-semantics analysis unit 120. Then, the syntax-and-semantics analysis unit 120 analyzes the syntax and semantics of the pre-update test class 111, and generates pre-update analysis-result information 131, which is inputted into the test-pattern production unit 140. The test-pattern production unit 140 produces pre-update test patterns 151 based on the pre-update analysis-result information 131 inputted as above. The test execution unit 180 refers to the pre-update test patterns 151, and verifies operations of the pre-update test class 111 based on the pre-update test patterns 151.

When a malfunction is found by the verification of the operation of the pre-update test class 111, the pre-update test class 111 is changed, and a post-update test class 112 is generated and inputted into the syntax-and-semantics analysis unit 120. The syntax-and-semantics analysis unit 120 analyzes the syntax and semantics of the post-update test class 112, and generates post-update analysis-result information 161.

Thereafter, the pre-update analysis-result information 131 and the post-update analysis-result information 161 are inputted into the update-time automatic inheritance unit 170. The update-time automatic inheritance unit 170 compares the pre-update analysis-result information 131 and the post-update analysis-result information 161, and determines a test pattern which can be inherited, based on an inheritance rule for a changed portion. Then, the update-time automatic inheritance unit 170 extracts from among the pre-update test patterns 151 at least one test pattern which can be inherited for at least one operational test of the post-update test class, and then sets the extracted test pattern in post-update test patterns 152.

After the update-time automatic inheritance unit 170 performs the operation for the automatic inheritance of the test pattern, the manual inheritance unit 190 displays details of the pre-update test patterns 151 and the post-update test patterns 152 on a screen provided in the input/output devices 14 for comparison. At this time, a portion which cannot be inherited automatically is highlighted. When an operator manipulates the keyboard 12 and the mouse 13 so as to input an instruction for inheritance of a test pattern, the manual inheritance unit 190 sets at least one of the pre-update test patterns 151 in the post-update test patterns 152 in accordance with the instruction. The test execution unit 180 performs verification of operations based on the post-update test patterns 152 generated as above.

Incidentally, the test classes 111 and 112 contain various methods (functions). The operations of these methods are defined by operation descriptions of the test classes 111 and 112 as portions of a source program. Each method contains a plurality of information items, and each information item has an attribute.

Figure 5:
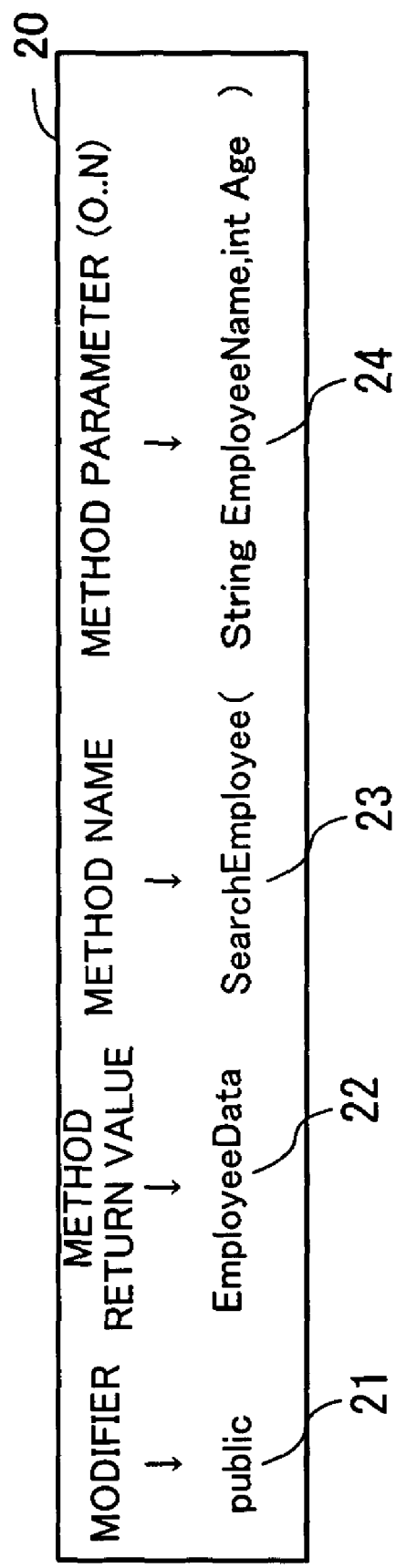
FIG. 5 is a diagram indicating attributes of information included in a method.

FIG. 5 is a diagram indicating attributes of information included in a method. In FIG. 5, a structure of the method 20 defined in Java (registered trademark) is shown. As illustrated in FIG. 5, the method 20 includes an identifier 21, a method return value 22, a method name 23, and method parameters 24 as attribute information items.

Figure 6:
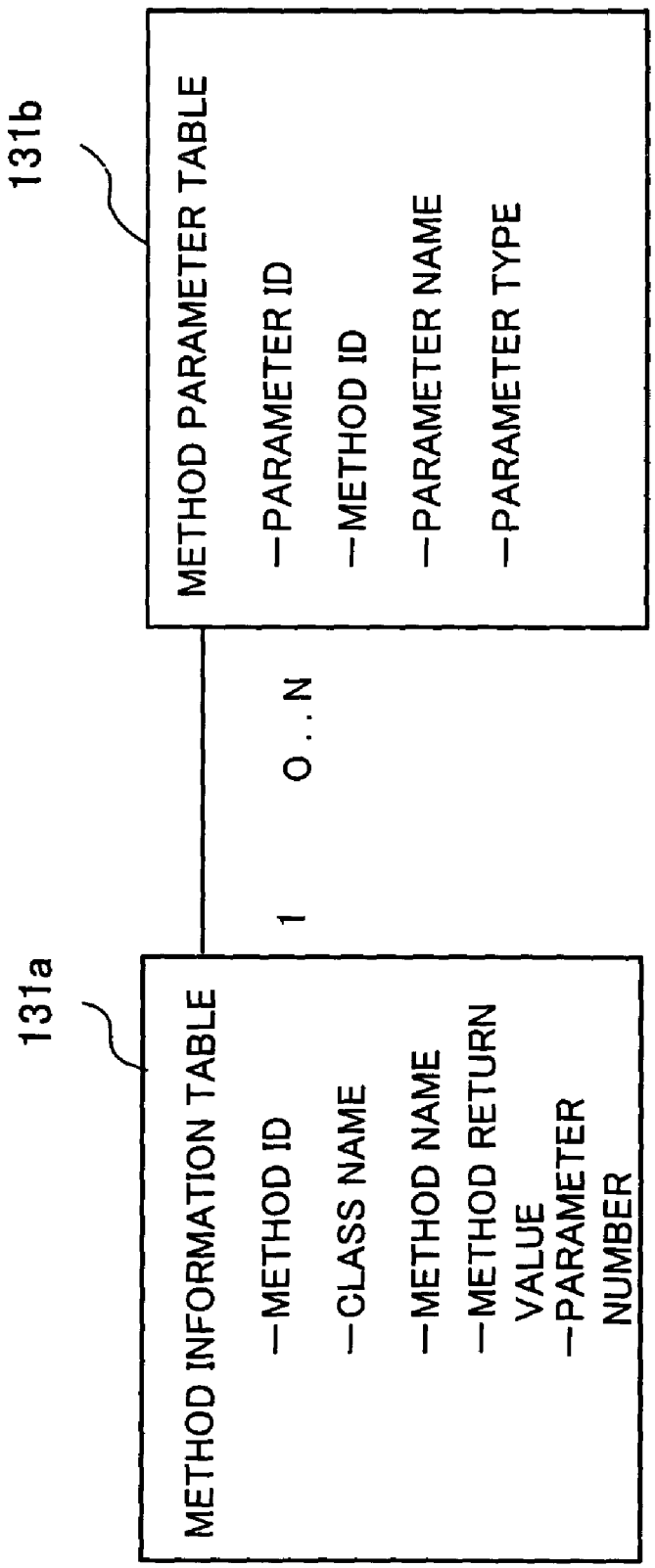
FIG. 6 is a diagram indicating an example of an arrangement for storage of the analysis-result information.

FIG. 6 is a diagram indicating an example of an arrangement for storage of the analysis-result information. The pre-update analysis-result information 131 comprises a plurality of method information tables 131*a* and a plurality of method parameter tables 131*b*. Information items such as a method ID, a class name, a method name, a method return value, and a parameter number are set in each method information table 131*a*, and information items such as a parameter ID, a method ID, a parameter name, and a parameter type are set in each method parameter table 131*b*.

The plurality of method information tables 131*a* and the plurality of method parameter tables 131*b* are linked with each other through method IDs. There is a one-to-N correspondence between the method information records registered in the method information tables 131*a* and the method parameters registered in the method parameter tables 131*b*, where N is an integer greater than zero. That is, more than one method parameter is associated with each method information record.

Example of Situation Before Update

Hereinbelow, details of an exemplary case where an operational test of the Employee class as a test class is performed are explained.

FIG. 7 is a diagram illustrating an example of a test class before an update. In this example, methods in the test class 111 are described in Java (registered trademark).

The first method 111*a* is a method which defines a function for searching for an employee based on the name of the employee, the second method 111*b* is a method which defines a function for searching for an employee based on the name and the age of the employee, the third method 111*c* is a method which defines a function for searching for an employee based on the name, the age, and a section code of the employee, the fourth method 111*d* is a method which defines a function for searching for an employee based on the name and the section code of the employee, the fifth method 111e is a method which defines a function for updating an employee information record based on an employee code, and the sixth method 111f is a method which defines a function for deleting an employee information record based on an employee code.

The above test class 111 is analyzed by the syntax-and-semantics analysis unit 120, and analysis-result information is generated. Hereinbelow, an example of storage of the analysis-result information 131 for the method "searchEmployeebyNo" in the Employee class is illustrated. As explained with reference to FIG. 6, the analysis-result information is constituted by the method information tables and the method parameter tables.

Figure 8:
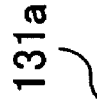
FIG. 8 is a diagram illustrating an example of a method information table before the update.

FIG. 8 is a diagram illustrating an example of a method information table before the update. The information elements arranged in each row of each method information table 131a are associated with each other, and constitute a method information record.

In the column of "Method ID," the successive numbers "1" to "6" corresponding to the first to sixth methods 111a to 111f are set. In the column of "Class Name," "Employee" is set for all of the method information records. In the column of "Method Name," the method names of the respective method information records are set. The method name corresponding to the method IDs "1" to "4" is "searchEmployee," the method name corresponding to the method ID "5" is "updateEmployee," and the method name corresponding to the method ID "6" is "deleteEmployee." In the column of "Return Value Type," the types of the method return values are set. The return value type corresponding to the method IDs "1" to "4" is "EmployeeData," the return value type corresponding to the method ID "5" is "boolean," and the return value type corresponding to the method ID "6" is "int."

In the column of "Parameter Number," the number of method parameters associated with each method is set. A method parameter is associated with the first method 111a having the method ID "1," two method parameters are associated with the second method 111b having the method ID "2," three method parameters are associated with the third method 111c having the method ID "3," two method parameters are associated with the fourth method 111d having the method ID "4," three method parameters are associated with the fifth method 111e having the method ID "5," and a method parameter is associated with the sixth method 111f having the method ID "6."

FIG. 9 is a diagram illustrating an example of a method parameter table before the update. The information elements arranged in each row of the method parameter table 131b are associated with each other, and constitute a method parameter.

In the column of "Parameter ID," the successive numbers "1" to "12" corresponding to the respective method parameters are set. In the column of "Method ID," the method IDs of the method information records associated with the respective method parameters are set. The method parameter having the parameter ID "1" is associated with the method information record having the method ID "1," the method parameters having the parameter IDs "2" and "3" are associated with the method information record having the method ID "2," the method parameters having the parameter IDs "4" to "6" are associated with the method information record having the method ID "3," the method parameters having the parameter IDs "7" and "8" are associated with the method information record having the method ID "4," the method parameters having the parameter IDs "9" to "11" are associated with the method information record having the method ID "5," and the method parameter having the parameter ID "12" is associated with the method information record having the method ID "6."

In the column of "Parameter Name," the name of each method parameter is set. The parameter name corresponding to the parameter IDs "1," "2," "4," "7," and "9" is "EmployeeName," the parameter name corresponding to the parameter IDs "3," "5," and "10" is "age," the parameter name corresponding to the parameter IDs "6," "8," and "11" is "code," and the parameter name corresponding to the parameter ID "12" is "EmployeeNo."

In the column of "Parameter Type," the data type of each method parameter is set. The parameter type corresponding to the parameter IDs "1," "2," "4," "7," and "9" is "String," and the parameter type corresponding to the parameter IDs "3," "5," "6," "8," and "10" to "12" is "int."

A test pattern is produced by the test-pattern production unit 140 based on the above analysis-result information. The test-pattern production unit 140 does not necessarily produce all test patterns automatically, and can produce a test pattern based on a manipulation input by an operator. For example, the test-pattern production unit 140 produces, for each method, a test pattern from which a normal return value is obtained and a test pattern from which a normal return value is not obtained. In addition, the test-pattern production unit 140 produces various test patterns in response to manipulation inputs by the operator through the input/output devices 14. When a test pattern arbitrarily inputted by the operator as above is used, it is possible to perform a highly reliable operational test.

Examples of Test Patterns Before Update

FIGS. 10 to 15 show examples of test patterns for the respective methods. In the following explanations, a set of test patterns for each method is called test pattern group.

FIG. 10 is a diagram illustrating examples of test patterns for a first method before the change of the test class. In the test pattern group 151a for the first method 111a, the columns of "Identification Number (No.)," "Method Name," "Parameter," "Normal/Abnormal," "Return Value," and "Viewpoint in Test" are set. The information elements arranged in each row of the table of FIG. 10 are associated with each other, and constitute a test pattern.

In the column of "Identification Number," identification numbers of the test patterns are set. A group number "M1" is set for the test pattern group corresponding to the first method 111a. The identification number of each test pattern is constituted by the group number "M1" and a branch number. In the example of FIG. 10, the identification numbers "M1-1," "M1-2," and "M1-3" are set for the three test patterns.

In the column of "Method Name," the name of the method which is to be tested with the test pattern is set. Since, in the example of FIG. 10, the test patterns are provided for the first method 111a, the method name "searchEmployee" of the first method 111a is set for all of the test patterns.

In the column of "Parameter Name," the values inputted as the parameter name "EmployeeName" for the first method 111a are set. The parameter having the parameter name "EmployeeName" is a parameter indicating a name of an employee. The value "F-tsu, Taro" is inputted for the test pattern having the identification number "M1-1," the value of the blank is inputted for the test pattern having the identification number "M1-2," and null (indicating absence of information) is inputted for the test pattern having the identification number "M1-3."

In the column of "Normal/Abnormal," information indicating whether the inputted parameter is a normal value or an abnormal value is set. The parameter inputted with the test pattern having the identification number "M1-1" is a normal value, the parameter inputted with the test pattern having the identification number "M1-2" is an abnormal value, and the parameter inputted with the test pattern having the identification number "M1-3" is an abnormal value.

In the column of "Return Value," information indicating the type of the return value "EmployeeData" from the first method 111a is set. The return value in response to input of the test pattern having the identification number "M1-1" is a result of a search, the return value in response to input of the test pattern having the identification number "M1-2" is null, and the return value in response to input of the test pattern having the identification number "M1-3" is null.

In the column of "Viewpoint in Test," objects of tests performed with the test patterns are indicated. A test of a normal system is performed with the test pattern having the identification number "M1-1," a test of an abnormal system in which the name is blank is performed with the test pattern having the identification number "M1-2," and a test of another abnormal system in which the name is null is performed with the test pattern having the identification number "M1-3." The column of "Viewpoint in Test" is provided for indicating the meanings of the test patterns, and not indispensable for the automatic inheritance of the test patterns or execution of tests.

Regarding the test patterns for the other methods, only portions different from the test patterns for the first method 111a are explained.

FIG. 11 is a diagram illustrating examples of test patterns for the second method before the change of the test class. In the test pattern group 151b for the second method 111b, a group number "M2" is set. In the example of FIG. 11, seven test patterns "M2-1" to "M2-7" are set. The method name of the second method 111b is "searchEmployee."

In the test patterns for the second method 111b, the parameters "EmployeeName" and "Age" are set, where the parameter "Age" is a parameter indicating the age of an employee.

In this example, test patterns for abnormal systems relating to the ages of employees are set as well as the test pattern (having the identification number "M2-1") for the normal system and the test patterns (having the identification numbers "M2-2" and "M2-3") for the abnormal systems relating to the names of the employees. For example, the test pattern (having the identification number "M2-4") is provided for an abnormal system in which the age is zero, the test patterns (having the identification numbers "M2-5" and "M2-6") are provided for abnormal systems in which the age is out of a certain range of employees' ages (i.e., too high or too low), and the test pattern (having the identification number "M2-7") is provided for an abnormal system in which the age is null.

FIG. 12 is a diagram illustrating examples of test patterns for the third method before the change of the test class. In the test pattern group 151c for the third method 111c, a group number "M3" is set. In the example of FIG. 12, ten test patterns "M3-1" to "M3-10" are set. The method name of the third method 111c is "searchEmployee."

In the test patterns for the third method 111c, the parameters "EmployeeName," "Age," and "code" are set, where the parameter "code" is a parameter indicating an employee code which uniquely identify an employee.

In this example, test patterns for abnormal systems relating to the employee codes of the employees are set as well as the test pattern (having the identification number "M3-1") for the normal system and the test patterns (having the identification numbers "M3-2" to "M3-7") for the abnormal systems relating to the names and ages of the employees. For example, the test pattern (having the identification number "M3-8") is provided for an abnormal system in which the employee code is zero, and the test pattern (having the identification number "M3-9") is provided for an abnormal system in which the employee code is null. In addition, in this example, another test pattern (having the identification number "M3-10") is provided for an abnormal system in which all of the parameters are null.

FIG. 13 is a diagram illustrating examples of test patterns for the fourth method before the change of the test class. In the test pattern group 151d for the fourth method 111d, a group number "M4" is set. In the example of FIG. 13, six test patterns "M4-1" to "M4-6" are set. The method name of the fourth method 111d is "searchEmployee." In the test patterns for the fourth method 111d, the parameters "EmployeeName" and "code" are set.

In this example, a test pattern (having the identification number "M4-1") for a normal system and test patterns (having the identification numbers "M4-2" to "M4-6") for the abnormal systems relating to the names and employee codes of the employees are set.

FIG. 14 is a diagram illustrating examples of test patterns for the fifth method before the change of the test class. In the test pattern group 151e for the fifth method 111e, a group number "M5" is set. In the example of FIG. 14, ten test patterns "M5-1" to "M5-10" are set. The method name of the fifth method 111e is "UpdateEmployee." In the test patterns for the fifth method 111e, the parameters "EmployeeName," "Age," and "code" are set.

In this example, a test pattern (having the identification number "M5-1") for a normal system and test patterns (having the identification numbers "M5-2" to "M5-10") for the abnormal systems relating to the names, ages, and employee codes of the employees are set as the test patterns for the third method 111c illustrated in FIG. 12.

FIG. 15 is a diagram illustrating examples of test patterns for the sixth method before the change of the test class. In the test pattern group 151f for the sixth method 111f, a group number "M6" is set. In the example of FIG. 15, four test patterns "M6-1" to "M6-4" are set. The method name of the sixth method 111f is "deleteEmployee." In the test patterns for the sixth method 111f, the parameter "code" is set.

In this example, a test pattern (having the identification number "M6-1") for a normal system and test patterns (having the identification numbers "M6-2" to "M6-4") for the abnormal systems relating to the employee codes are set. There are three types of abnormal systems: the employee code is zero in the first type; the employee code is null in the second type; and the employee code is not applicable in the third type. The return value in the normal system is "True," and the return values in the abnormal systems are "False."

When the above test patterns are used, it is possible to confirm whether or not the test class operates as designed.

Incidentally, the test patterns having the identification numbers "M2-5" and "M2-6" for the second method 111b and the test pattern having the identification number "M6-4" for the sixth method 111f are examples of the test patterns which cannot be automatically produced by the test-pattern production unit 140. The test patterns having the identification numbers "M2-5" and "M2-6" for the second method 111b cannot be set unless an age group as the range of employees ages is known. In addition, the test pattern having the identification number "M6-4" for the sixth method 111f cannot be set unless an employee code to which no employee corresponds is known. Therefore, for these test patterns, the operator is required to input parameters according to an environment in which the test classes are used.

In the case where the above setting information for tests (the above set of test patterns) can be inherited and utilized even after at least one function (method) is changed, it is unnecessary to set again the test class which has already been set by the operator according to the environment in which the test class is used. Therefore, in the present embodiment, a change pattern of a function and an inheritance rule in the case of the change are determined so that the above setting information can be utilized in the new function (method).

In the inheritance rule, attention is focused on attributes of a function (method). There are three attributes in the above example. The three attributes are indispensable for realization of the function, and priorities are assigned to the three attributes. Possibility of inheritance of a test pattern is determined based on whether or not an attribute of a method before an update coincides with an attribute of a method after the update. When there are a plurality of post-update methods each of which has an attributes identical to an attribute of a pre-update method, the attribute of the pre-update method is inherited by one of the plurality of methods having an attribute to which the highest priority is assigned.

In the present embodiment, the priorities are assigned to the respective attributes as follows.

The first priority is assigned to the method name (a designation of each function); the second priority is assigned to the method parameter (an operational condition of a function); and the third priority is assigned to the method return value (a result of a function).

The above attributes are considered in the criteria for determining whether or not inheritance is possible, for the following reasons.

The reason why the first priority is assigned to the method name is as follows:

In the object-oriented programming, different methods do not have an identical method name. In addition, generally, the method name is not changed even when the method is partially changed. Therefore, when a pre-update test class 111 and a post-update test class 112 have methods having an identical method name, it is possible to inherit a method parameter and a return value from the test pattern for the method in the pre-update test class 111. Therefore, the method name is adopted as an attribute having the first priority.

The reason why the second priority is assigned to the method parameter is as follows:

It is verified, by a test of a test class, that a correct return value is returned when a normal parameter is inputted to a method, and a return value indicating abnormality such as error is returned when an abnormal parameter is inputted to a method. Therefore, at least one test pattern containing a set of normal parameters and at least one test pattern containing a set of parameters at least one of which is an abnormal parameter are prepared. In many cases of method change, an operation description is changed without change of a parameter which is inputted. Therefore, in the case where a set of method parameters inputted to a method in the pre-update test class 111 are identical to a set of method parameters inputted to a method in the post-update test class 112, method parameters in test patterns for the pre-update test class 111 can be inherited by test patterns for the post-update test class 112. Thus, in the present embodiment, the method parameter is adopted as an attribute having the second priority.

The reason why the third priority is assigned to the method return value is as follows:

Even when method parameters are different between the pre-update test class 111 and the post-update test class 112, the method return value can be inherited as far as the method return values before and after the update are identical. Therefore, in the present embodiment, the method return value is adopted as an attribute having the third priority.

Example of Situation After Update

Hereinbelow, a situation of inheritance of test patterns performed when a test class is updated is explained.

FIG. 16 is a diagram illustrating an example of the test class after the update. The following portions are changed from the pre-update test class illustrated in FIG. 7.

In the first method 112a, the modifier is changed. That is, while the modifier in the first method 111a before the update is "public," the modifier in the first method 112a after the update is "private."

In the second method 112b, the method return value is changed. That is, while the method return value in the second method 111b before the update is "EmployeeData," the method return value in the second method 112b after the update is "EmployeeData [ ]."

In the third method 112c, the method parameter is changed. That is, while the method parameters in the third method 111c before the update are specified as "String EmployeeName,int Age,int code," the method parameters in the third method 112c after the update are specified as "String EmployeeName,long Age,int section,Boolean retire."

In the fourth method 112d, the method return value and the method parameter are changed. That is, while the method return value in the fourth method 111d before the update is "EmployeeData," the method return value in the fourth method 112d after the update is "EmployeeData [ ]." In addition, while the method parameters in the fourth method 111d before the update are specified as "String EmployeeName,int code," the method parameters in the fourth method 112d after the update are specified as "String EmployeeName,int section."

In the fifth method 112e, the method name is changed. That is, while the method name in the fifth method 111e before the update is "updateEmployee," the method name in the fifth method 112e after the update is "updateEmployeebyNo."

In the sixth method 112f, the method name and the method parameter are changed. That is, while the method name in the sixth method 111f before the update is "deleteEmployee," the method name in the sixth method 112f after the update is "deleteEmployeebyNo." In addition, while the method parameter in the sixth method 111f before the update is specified as "int EmployeebyNo," the method parameters in the sixth method 112f after the update are specified as "int EmployeebyNo, StringEmployeeName."

When the post-update test class 112 containing the above methods 112a to 112f is generated, the syntax-and-semantics analysis unit 120 performs analysis, and generates analysis-result information 161.

FIG. 17 is a diagram illustrating an example of a method information table after the update. The information elements arranged in each row of the method information table 161a of FIG. 17 are associated with each other, and constitute a method information record.

In the column of "Method ID," successive numbers "1" to "6" corresponding to the respective methods are set. In the column of "Class Name," "Employee" is set for all of the method information records. In the column of "Method Name," the method names of the respective method information records are set. The method name corresponding to the method IDs "1" to "4" is "searchEmployee," the method name corresponding to the method ID "5" is "updateEmployeebyNo," and the method name corresponding to the method ID "6" is "deleteEmployeebyNo."

In the column of "Return Value Type," the types of the method return values are set. The return value type corresponding to the method IDs "1" and "3" is "EmployeeData," the return value type corresponding to the method IDs "2" and "4" is "EmployeeData[ ]," the return value type corresponding to the method ID "5" is "Boolean," and the return value type corresponding to the method ID "6" is "int."

In the column of "Parameter Number," the number of method parameters associated with each method is set. A method parameter is associated with the first method having the method ID "1," two method parameters are associated with the second method having the method ID "2," four method parameters are associated with the third method having the method ID "3," two method parameters are associated with the fourth method having the method ID "4," three method parameters are associated with the fifth method having the method ID "5," and a method parameter is associated with the sixth method having the method ID "6."

Figure 18:
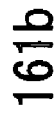
FIG. 18 is a diagram illustrating an example of a method parameter table after the update.

FIG. 18 is a diagram illustrating an example of a method parameter table after the update. The information elements arranged in each row of the method parameter table 161b are associated with each other, and constitute a method parameter.

In the column of "Parameter ID," the successive numbers "1" to "14" corresponding to the respective method parameters are set. In the column of "Method ID," the method IDs of the method information records associated with the respective method parameters are set. The method parameter having the parameter ID "1" is associated with the method information record having the method ID "1," the method parameters having the parameter IDs "2" and "3" are associated with the method information record having the method ID "2," the method parameters having the parameter IDs "4" to "7" are associated with the method information record having the method ID "3," the method parameters having the parameter IDs "8" and "9" are associated with the method information record having the method ID "4," the method parameters having the parameter IDs "10" to "12" are associated with the method information record having the method ID "5," and the method parameters having the parameter IDs "13" and "14" are associated with the method information record having the method ID "6."

In the column of "Parameter Name," the name of each method parameter is set. The parameter name corresponding to the parameter IDs "1," "2," "4," "8," "10," and "14" is "EmployeeName," the parameter name corresponding to the parameter IDs "3," "5," and "11" is "Age," the parameter name corresponding to the parameter IDs "6" and "9" is "Section," the parameter name corresponding to the parameter ID "7 is "Retire," and the parameter name corresponding to the parameter ID "13" is "EmployeeNo."

In the column of "Parameter Type," the data type of each method parameter is set. The parameter type corresponding to the parameter IDs "1," "2," "4," "8," "10," and "14" is "String," the parameter type corresponding to the parameter IDs "3," "6," "9," and "11" to "13" is "int," the parameter type corresponding to the parameter ID "5" is "Long," and the parameter type corresponding to the parameter ID "7" is "Boolean."

Flow of Automatic Inheritance

Figure 19:
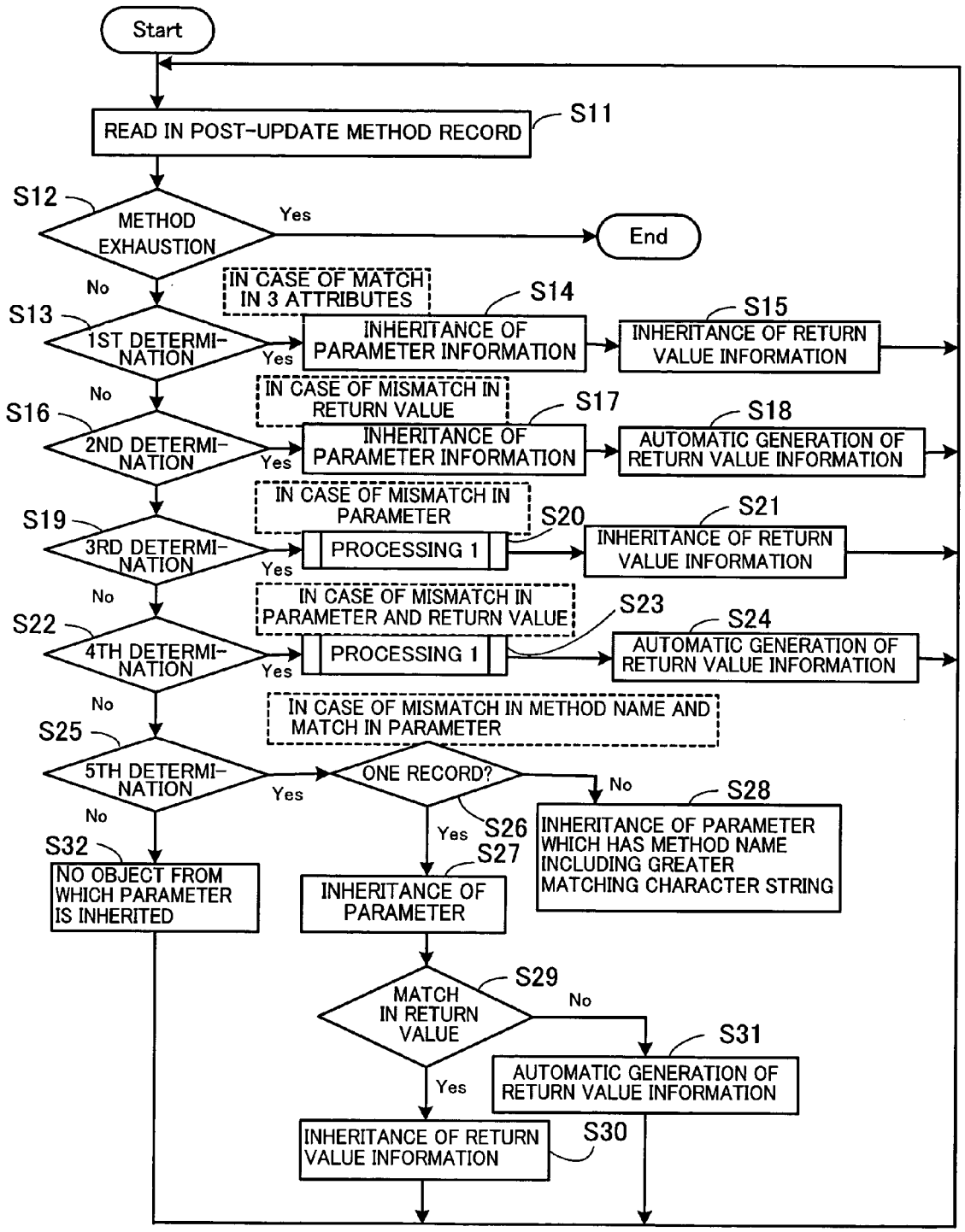
FIG. 19 is a main flowchart indicating an outline of processing for automatically inheriting test patterns.
Figure 20:
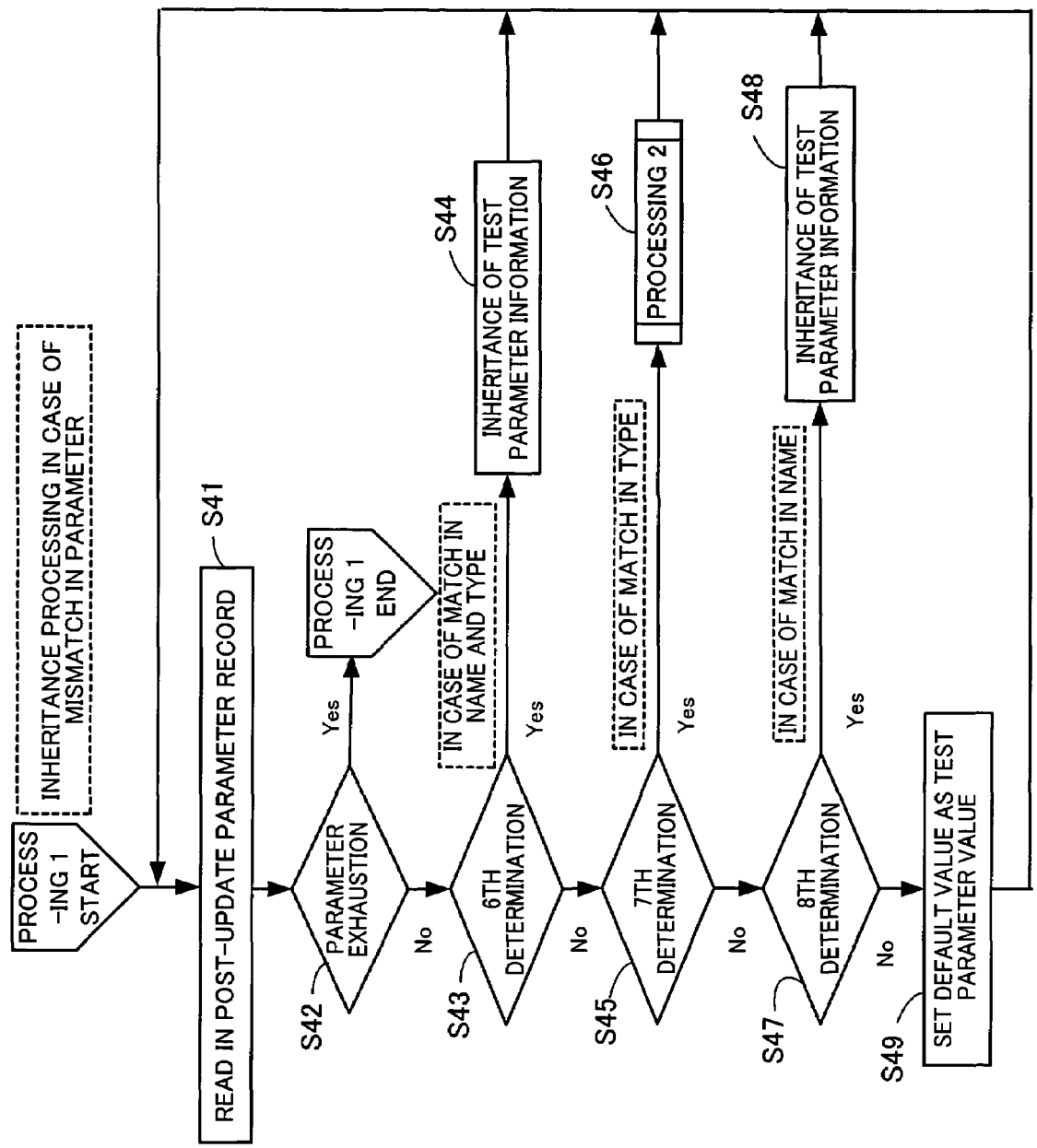
FIG. 20 is a flowchart indicating processing for inheritance of at least one mismatching parameter.
Figure 21:
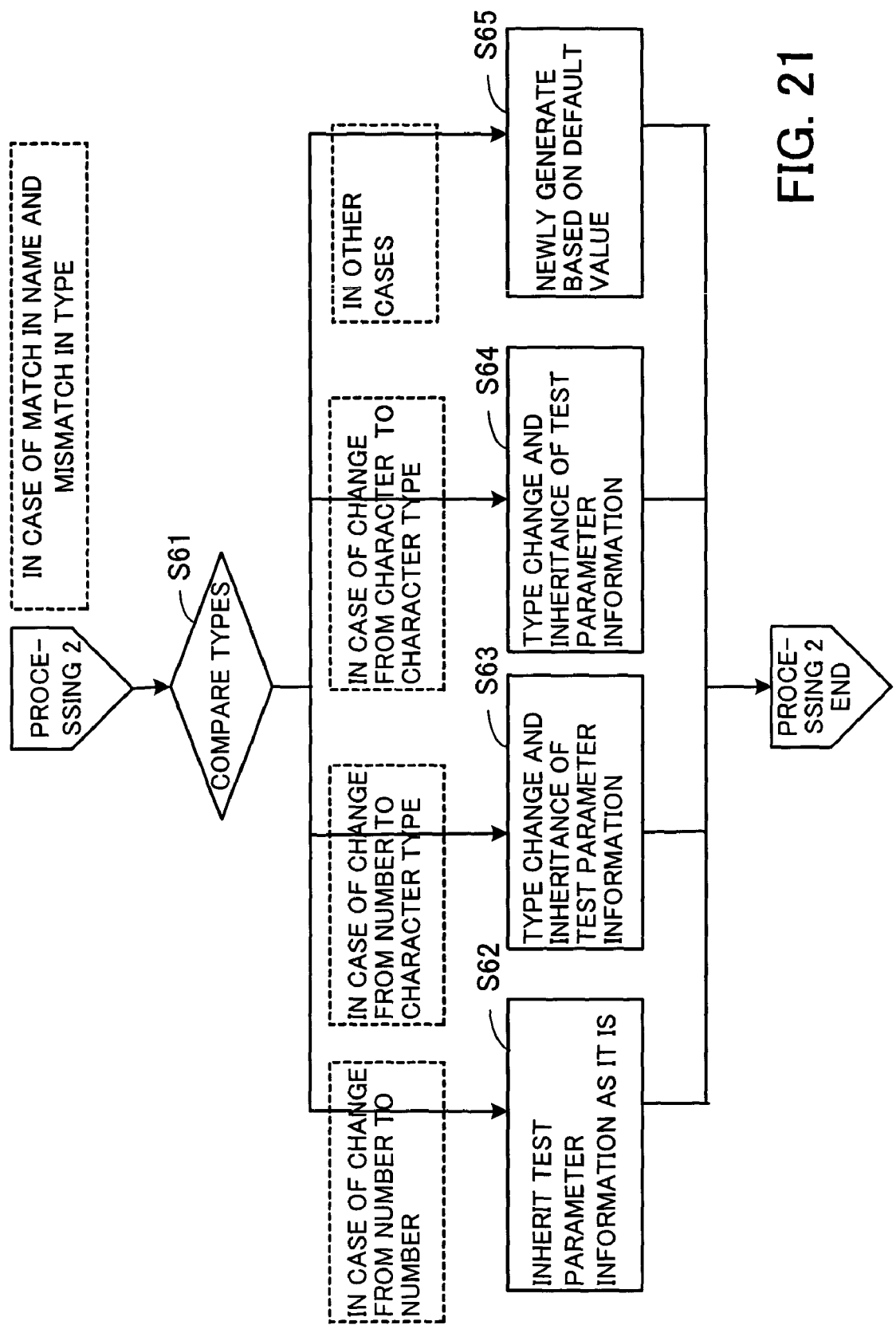
FIG. 21 is a flowchart indicating processing in a case where a match of a parameter name and a mismatch of a parameter type occur.

When the post-update analysis-result information as illustrated in FIGS. 17 and 18 is generated, the update-time automatic inheritance unit 170 performs processing for automatically inheriting test patterns. FIGS. 19 to 21 show flowcharts indicating the processing for automatically inheriting test patterns.

FIG. 19 is a main flowchart indicating an outline of processing for automatically inheriting test patterns. The processing illustrated in FIG. 19 is explained below step by step. The entire processing of FIG. 19 is performed by the update-time automatic inheritance unit 170.

[Step S11] The update-time automatic inheritance unit 170 reads in a not-yet-processed method information record (a method information record which has not yet been processed) from the post-update analysis-result information 161. Specifically, the update-time automatic inheritance unit 170 successively reads in a method information record from the method information table 161a, and a record of a method parameter associated with the read-in method information record from the method parameter table 161b. The method information record is associated with the method parameter through a method ID. In other words, the method information record and the method parameter having an identical method ID are associated with each other.

[Step S12] The update-time automatic inheritance unit 170 determines whether or not methods to be processed are exhausted (i.e., whether or not method exhaustion occurs). Specifically, when no not-yet-processed method which is to be read is found in the read-in processing in step S11, it is determined that the method exhaustion occurs. When the method exhaustion occurs, the processing for automatic inheritance of test patterns is completed. When the method exhaustion does not occur (i.e., when a method information record is read in in step S11), the operation goes to step S13.

[Step S13] The update-time automatic inheritance unit 170 determines whether or not the pre-update analysis-result information 131 includes a pre-update method information record which is identical to the method information record read in in step S11 in the three attributes (the method name, the parameter name and type, and the return-value type). This determination is indicated as the first determination in FIG. 19. When the yes is determined in step S13, the operation goes to step S14. When no is determined in step S13, the operation goes to step S16.

[Step S14] The update-time automatic inheritance unit 170 makes test patterns corresponding to the method information record read in in step S11 inherit information on method parameters in test patterns corresponding to the method information record which is determined to be included in the pre-update analysis-result information 131 in step S13.

[Step S15] The update-time automatic inheritance unit 170 makes the test patterns corresponding to the method information record read in in step S11 inherit information on return values in the test patterns corresponding to the method information record which is determined to be included in the pre-update analysis-result information 131 in step S13. Thereafter, the operation goes to step S11.

[Step S16] The update-time automatic inheritance unit 170 determines whether or not the pre-update analysis-result information 131 includes a pre-update method information record which is identical to the method information record read in in step S11 in the two attributes (the method name and the parameter name and type) other than the return-value type. This determination is indicated as the second determination in FIG. 19. When yes is determined in step S16, the operation goes to step S17. When no is determined in step S16, the operation goes to step S19.

[Step S17] Information on method parameters in test patterns corresponding to the method information record which is determined to be included in the pre-update analysis-result information 131 in step S16 is inherited by the test patterns corresponding to the method information record read in in step S11.

[Step S18] The update-time automatic inheritance unit 170 automatically generates information on return values, and makes the test patterns corresponding to the method information record read in in step S11 inherit the information on return values. Thereafter, the operation goes to step S11.

[Step S19] The update-time automatic inheritance unit 170 determines whether or not the pre-update analysis-result information 131 includes a pre-update method information record which is identical to the method information record read in in step S11 in the two attributes (the method name and the return-value type) other than the parameter (the parameter name and type). This determination is indicated as the third determination in FIG. 19. When yes is determined in step S19, the operation goes to step S20. When no is determined in step S19, the operation goes to step S22.

[Step S20] Processing for inheritance of at least one mismatching parameter is performed. Details of this processing are explained later.

[Step S21] The update-time automatic inheritance unit 170 makes the test patterns corresponding to the method information record read in in step S11 inherit information on return values in test patterns corresponding to the method information record which is determined to be included in the pre-update analysis-result information 131 in step S19.

[Step S22] The update-time automatic inheritance unit 170 determines whether or not the pre-update analysis-result information 131 includes a pre-update method information record which is identical to the method information record read in in step S11 in only the method name and is not identical to the method information record read in in step S11 in the other attributes (the parameter name and type and the return-value type). This determination is indicated as the fourth determination in FIG. 19. When yes is determined in step S22, the operation goes to step S23. When no is determined in step S22, the operation goes to step S25.

[Step S23] Processing for inheritance of at least one mismatching parameter is performed. Details of this processing are explained later.

[Step S24] The update-time automatic inheritance unit 170 automatically generates information on return values, and makes the test patterns corresponding to the method information record read in in step S11 inherit the information on return values. Thereafter, the operation goes to step S11.

[Step S25] The update-time automatic inheritance unit 170 determines whether or not the pre-update analysis-result information 131 includes a pre-update method information record which is identical to the method information record read in in step S11 in the parameter name and type and is not identical to the method information record read in in step S11 in the method name. This determination is indicated as the fifth determination in FIG. 19. When yes is determined in step S25, the operation goes to step S26. When no is determined in step S25, the operation goes to step S32.

[Step S26] The update-time automatic inheritance unit 170 determines whether or not the pre-update analysis-result information 131 includes only one pre-update method information record which is identical to the method information record read in in step S11 in the parameter name and type and is not identical to the method information record read in in step S11 in the method name. When yes is determined in step S26, the operation goes to step S27. When it is determined in step S26 that the pre-update analysis-result information 131 includes more than one pre-update method information record which is identical to the method information record read in in step S11 in the parameter name and type and is not identical to the method information record read in in step S11 in the method name, the operation goes to step S28.

[Step S27] The update-time automatic inheritance unit 170 makes the test patterns corresponding to the method information record read in in step S11 inherit information on method parameters in test patterns corresponding to the method information record which is determined to be included in the pre-update analysis-result information 131 in step S25. Thereafter, the operation goes to step S29.

[Step S28] The update-time automatic inheritance unit 170 selects, as an object to be inherited, a pre-update method information record in which the method name includes the greatest number of characters common to characters constituting the method name in the method information record read in in step S11, from among the more than one pre-update method information record which is determined to be included in the pre-update analysis-result information 131 in step S26. Then, the update-time automatic inheritance unit 170 makes the test patterns corresponding to the method information record read in in step S11 inherit information on method parameters in test patterns corresponding to the selected pre-update method information record.

[Step S29] The update-time automatic inheritance unit 170 determines whether or not the pre-update method information record which is selected in step S28 as the object to be inherited is identical to the method information record read in in step S11 in the return-value type. When yes is determined in step S29, the operation goes to step S30. When no is determined in step S29, the operation goes to step S31.

[Step S30] The update-time automatic inheritance unit 170 makes the test patterns corresponding to the method information record read in in step S11 inherit information on return values in the test patterns corresponding to the pre-update method information record which is selected in step S28 as the object to be inherited. Thereafter, the operation goes to step S11.

[Step S31] The update-time automatic inheritance unit 170 automatically generates information on return values, and makes the test patterns corresponding to the method information record read in in step S11 inherit the information on the return values. Thereafter, the operation goes to step S11.

[Step S32] The update-time automatic inheritance unit 170 determines that there is no method information record before the update from which test patterns can be inherited by the test patterns for the method information record read in in step S11. Thereafter, the operation goes to step S11.

FIG. 20 is a flowchart indicating the processing for inheritance of at least one mismatching parameter. The processing illustrated in FIG. 20 is explained below step by step. The entire processing of FIG. 20 is performed by the update-time automatic inheritance unit 170.

[Step S41] The update-time automatic inheritance unit 170 reads in a not-yet-processed parameter from the method information record read in in step S11.

[Step S42] The update-time automatic inheritance unit 170 determines whether or not at least one parameter to be processed is exhausted (i.e., whether or not parameter exhaustion occurs). Specifically, when no not-yet-processed parameter to be read in is found in the read-in processing in step S41, it is determined that the parameter exhaustion occurs. In the case of parameter exhaustion, the processing for inheritance of at least one mismatching parameter is completed. When the parameter exhaustion does not occur (i.e., when a parameter is read in in step S41), the operation goes to step S43.

[Step S43] The update-time automatic inheritance unit 170 determines whether or not the pre-update method information record as an object from which inheritance is considered to be performed contains a parameter which is identical to the parameter read in in step S41 in the parameter name and the parameter type. This determination is indicated as the sixth determination in FIG. 20. When yes is determined in step S43, the operation goes to step S44. When no is determined in step S43, the operation goes to step S45.

[Step S44] The update-time automatic inheritance unit 170 makes the test patterns for the method information record read in in step S11 inherit information on the parameter which is determined in step S43 to be contained in the pre-update method information record as the object from which inheritance is considered to be performed. Thereafter, the operation goes to step S41.

[Step S45] The update-time automatic inheritance unit 170 determines whether or not the pre-update method information record as the object from which inheritance is considered to be performed contains a parameter which is identical to the parameter read in in step S41 in the parameter name. This determination is indicated as the seventh determination in FIG. 20. When yes is determined in step S45, the operation goes to step S46. When no is determined in step S45, the operation goes to step S47.

[Step S46] Processing for inheritance for the case where a match of the parameter name and a mismatch of the parameter type occur is performed. Details of this processing are explained later.

[Step S47] The update-time automatic inheritance unit 170 determines whether or not the pre-update method information record as the object from which inheritance is considered to be performed contains a parameter which is identical to the parameter read in in step S41 in the parameter type. This determination is indicated as the eighth determination in FIG. 20. When yes is determined in step S47, the operation goes to step S48. When no is determined in step S47, the operation goes to step S49.

[Step S48] The update-time automatic inheritance unit 170 makes the test patterns for the method information record read in in step S11 inherit information on the parameter which is determined in step S47 to be contained in the pre-update method information record as the object from which inheritance is considered to be performed. Thereafter, the operation goes to step S41.

[Step S49] The update-time automatic inheritance unit 170 sets a default value as the parameter read in in step S41. Thereafter, the operation goes to step S41.

FIG. 21 is a flowchart indicating processing in a case where a match of a parameter name and a mismatch of a parameter type occur. The processing illustrated in FIG. 21 is explained below step by step. The entire processing of FIG. 21 is performed by the update-time automatic inheritance unit 170.

[Step S61] The update-time automatic inheritance unit 170 compares the parameter types. In the case where the parameter type before the update is a first numerical-value type, and the parameter type after the update is a second numerical-value type, the operation goes to step S62. In the case where the parameter type before the update is a numerical-value type, and the parameter type after the update is a character type, the operation goes to step S63. In the case where the parameter type before the update is a first character type, and the parameter type after the update is a second character type, the operation goes to step S64. In the other cases, the operation goes to step S65.

[Step S62] Since the pre-update parameter of the first numerical-value type is changed to the post-update parameter of the second numerical-value type, the update-time automatic inheritance unit 170 makes the post-update test patterns inherit the parameter in the pre-update test patterns. Thereafter, the operation goes to step S41 in FIG. 20.

[Step S63] Since the pre-update parameter of a numerical-value type is changed to the post-update parameter of a character type, the update-time automatic inheritance unit 170 changes the parameter type of the parameter in the pre-update test patterns to the character type, and makes the post-update test patterns inherit the parameter in the pre-update test patterns. Thereafter, the operation goes to step S41 in FIG. 20.

[Step S64] Since the pre-update parameter of the first character type is changed to the post-update parameter of the second character type, the update-time automatic inheritance unit 170 changes the parameter type of the parameter in the pre-update test patterns to the second character type, and makes the post-update test patterns inherit the parameter in the pre-update test patterns. Thereafter, the operation goes to step S41 in FIG. 20.

[Step S65] In this case, the update-time automatic inheritance unit 170 generates a default value as the parameter in the post-update test patterns. Thereafter, the operation goes to step S41 in FIG. 20.

Thus, a portion or all of the pre-update test patterns 151 produced for testing the pre-update test class 111 can be inherited by the post-update test patterns 152 for testing the post-update test class 112.

The flowchart of FIG. 19 includes five types of determination processing (steps S13, S16, S19, S22, and S25). Each type of determination processing determines a difference between methods before and after the update in an attribute.

FIG. 22 is a diagram indicating relationships between determinations and attributes of a method. That is, FIG. 22 shows a combination of at least one match and/or at least one mismatch occurring in the attributes which makes each determination result yes, where each matching attribute is indicated by a circle (O), and each mismatching attribute is indicated by a cross (X).

The result of the first determination in step S13 is yes when a match occurs in each of the method name, the parameter, and the return value. The result of the second determination in step S16 is yes when a match occurs in each of the method name and the parameter, and a mismatch occurs in the return value. The result of the third determination in step S19 is yes when a match occurs in each of the method name and the return value, and a mismatch occurs in the parameter. The result of the fourth determination in step S22 is yes when a match occurs in only the method name, and a mismatch occurs in each of the parameter and the return value. The result of the fifth determination in step S25 is yes when a match occurs in the parameter, and a mismatch occurs in the method name, regardless of a match or mismatch of the return value.

Examples of Inheritance of Test Patterns

Examples of inheritance of test patterns when the pre-update test class 111 illustrated in FIG. 7 is updated to the post-update test class 112 illustrated in FIG. 16 are explained in detail below.

FIG. 23 is a diagram illustrating examples of results of automatic determinations of test patterns according to changes of methods.

The result of the first determination (in step S13) for the first method 112a after the update is yes when the first method 111a before the update is an object from which inheritance is to be performed. Therefore, all of the information in the test patterns (having the identification numbers "M1-1" to "M1-3") in the test pattern group 151a illustrated in FIG. 10 is inherited.

The result of the second determination (in step S16) for the second method 112b after the update is yes when the second method 111b before the update is an object from which inheritance is to be performed. Therefore, all of the information in the test patterns (having the identification numbers "M2-1" to "M2-7") in the test pattern group 151b illustrated in FIG. 11 is inherited.

The result of the third determination (in step S19) for the third method 112c after the update is yes when the third method 111c before the update is an object from which inheritance is to be performed. Therefore, all of the information in the test patterns (having the identification numbers "M3-1" to "M3-10") in the test pattern group 151c illustrated in FIG. 12 is inherited.

The result of the fourth determination (in step S22) for the fourth method 112d after the update is yes when the fourth method 111d before the update is an object from which inheritance is to be performed. Therefore, all of the information in the test patterns (having the identification numbers "M4-1" to "M4-6") in the test pattern group 151d illustrated in FIG. 13 is inherited.

The result of the fifth determination (in step S25) for the fifth method 112e after the update is yes when the fifth method 111e before the update is an object from which inheritance is to be performed. Therefore, all of the information in the test patterns (having the identification numbers "M5-1" to "M5-10") in the test pattern group 151e illustrated in FIG. 14 is inherited.

On the other hand, no method as an object from which inheritance is to be performed is detected in the first to sixth determinations for the sixth method 112f after the update. That is, the results of the first to sixth determinations for the sixth method 112f after the update are no. Therefore, automatic inheritance of test patterns is not performed in the sixth method 112f after the update.

Incidentally, in inheritance of test patterns, information actually inherited is not necessarily all information contained in the test patterns. For example, only one of a parameter and a return value is inherited. Concrete examples of inheritance of the test patterns respectively relating to the determination results of the methods illustrated in FIG. 23 are explained below.

Examples of Inheritance of Test Patterns for First Method

The first method 111a in the pre-update test class 111 is selected as an object from which the first method 112a in the post-update test class 112 inherits information. The test pattern group 151a for the first method 111a before the update is illustrated in FIG. 10.

At this time, the first method 111a before the update and the first method 112a after the update are compared.

Figure 24:
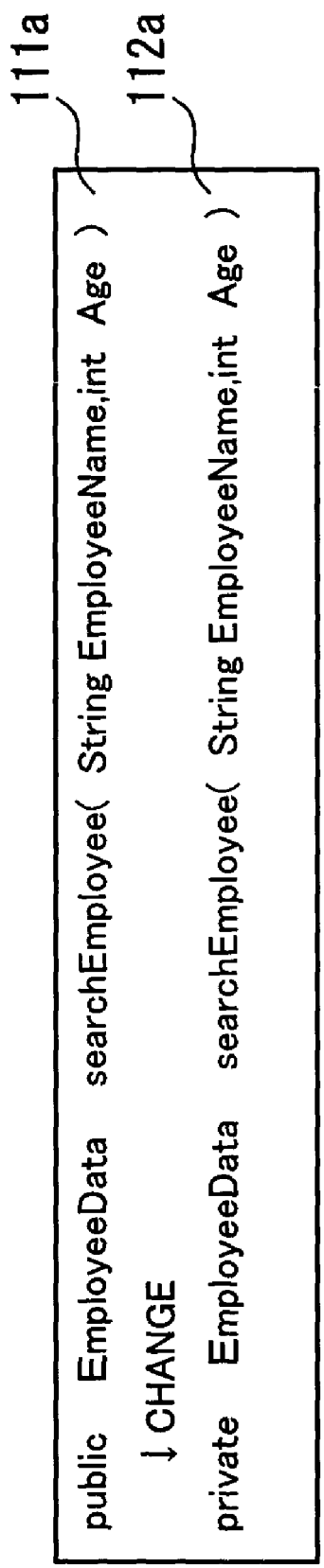
FIG. 24 is a diagram illustrating details of correction of the first method.

FIG. 24 is a diagram illustrating details of correction of the first method. As illustrated in FIG. 24, the modifier is changed from "public" to "private."

FIG. 25 is a diagram illustrating a comparison result for each attribute of the first method. As illustrated in FIG. 25, only the modifier, which is indicated in the column of "Others," is changed, and the method name, the method parameter, and the method return value are not changed.

In this case, the test pattern group 151a (illustrated in FIG. 10) which has been set for the first method 111a before the update is inherited, as it is, by the post-update test patterns 152 for the first method 112a after the update.

Examples of Inheritance of Test Patterns for Second Method

The second method 111b in the pre-update test class 111 is selected as an object from which the second method 112b in the post-update test class 112 inherits information. The test pattern group 151b for the second method 111b before the update is illustrated in FIG. 11.

At this time, the second method 111b before the update and the second method 112b after the update are compared.

FIG. 26 is a diagram illustrating details of correction of the second method. As illustrated in FIG. 26, the method return value is changed from "EmployeeData" to "EmployeeData[ ]."

FIG. 27 is a diagram illustrating a comparison result for each attribute of the second method. As illustrated in FIG. 27, only the method return value is changed, and the method name, the method parameter, and the other attribute are not changed.

In this case, information on the method parameter in each test pattern in the test pattern group 151b is inherited, and a default value is set as the return value.

FIG. 28 is a diagram illustrating examples of test patterns for the second method after the update. The test patterns in the test pattern group 152b for the second method after the update are different from the test pattern group 152b for the second method before the update (which are illustrated in FIG. 11) in that the return values are default values. The other information in the test patterns in the test pattern group 152b for the second method after the update is identical to the test pattern group 151b for the second method before the update. In the example of FIG. 28, the default value for the method return value is "Null."

Examples of Inheritance of Test Patterns for Third Method

The third method 111c in the pre-update test class 111 is selected as an object from which the third method 112c in the post-update test class 112 inherits information. The test pattern group 151c for the third method 111c before the update is illustrated in FIG. 12.

At this time, the third method 111c before the update and the third method 112c after the update are compared.

FIG. 29 is a diagram illustrating details of correction of the third method. As illustrated in FIG. 29, the method parameters are changed from "String EmployeeName,int Age,int code" to "String EmployeeName,long Age,int section,boolean retire."

FIG. 30 is a diagram illustrating a comparison result for each attribute of the third method. As illustrated in FIG. 30, only the method parameters are changed, and the method name, the method return value, and the other attribute are not changed.

Examples of determination in the case where a mismatch of a parameter occurs are indicated below.

(Sixth Determination)

According to the sixth determination, inheritance is performed when a match occurs in each of the parameter name and the parameter type. In the example illustrated in FIG. 30, "String EmployeeName" is not changed by the update, and a match occurs in each of the parameter name and the parameter type. Therefore, information corresponding to "String EmployeeName" in the pre-update test patterns is inherited, as it is, by the post-update test patterns.

(Seventh Determination)

When the result of the sixth determination is no, and a match of the parameter name occurs, inheritable data is inherited, where data is inheritable when the parameter type is changed by the update from a first numerical-value type to a second numerical-value type, from a numerical-value type to a character type, or from a first character type to a second character type. When the parameter type is changed by the update from a first numerical-value type to a second numerical-value type, inheritance is performed as far as type conversion is possible. The basic data types of numbers include "int," "long," "double," "float," "decimal," and "Bigdecimal." In the case where the parameter type is changed by the update from a numerical-value type to a character type, numbers are converted into the character strings for inheritance. In the case where the parameter types before and after the update are a character type, character strings before the update are inherited as they are.

In the example illustrated in FIG. 30, the parameter mint age" before the update is detected in correspondence with the parameter "long age," where the parameter names before and after the update match, and the parameter types before and after the update do not match. Since, in this case, the parameter types before and after the update are numerical-value types, the parameter before the update can be inherited in a form of a number. That is, values which are set as the parameter "int age" in the pre-update test patterns are inherited as values of the parameter "long age" in the post-update test patterns. Since the values in both of the pre-update test patterns and the post-update test patterns are numerical values, the values in the pre-update test patterns are inherited as numbers.

(Eighth Determination)

When the result of the seventh determination is no, and a match of the parameter type occurs, a parameter of the matching parameter type is inherited. In the example of FIG. 30, the parameter "int code" before the update is detected in correspondence with the parameter "int section" after the update having the matching parameter type, since both parameters has the parameter type "int." Therefore, values which are set as the parameter "int code" in the pre-update test patterns are inherited as values of the parameter "int section" in the post-update test patterns.

When an inheritable legacy parameter for a new parameter is not found by the eighth determination, a default value (new data) is generated as test data of the new parameter, where the default value is an initial input value of the test data. When the test data is a number of a basic type, an arbitrary numerical value can be provided as the default value. Since, in the example of FIG. 30, there is no parameter which corresponds to the parameter "boolean retire" and can be inherited, a default value "true" is generated, and a test pattern is produced by using the default value.

FIG. 31 is a diagram illustrating examples of test patterns for the third method. In the test pattern group 152c for the third method after the update illustrated in FIG. 31, the method names of the test patterns are not shown. In addition, for easy understanding of a determination result obtained by comparison of parameters, parameters before the update, parameters after the update, and comparison results are indicated.

The values of the parameter "String EmployeeName" in the pre-update test patterns are inherited, as they are, by the parameter "String EmployeeName" in the post-update test patterns. The values of the parameter "int Age" in the pre-update test patterns are inherited, as they are, by the parameter "long Age" in the post-update test patterns. The values of the parameter "int Code" in the pre-update test patterns are inherited, as they are, by the parameter "int Section" in the post-update test patterns. Since there is no parameter which can be inherited by the parameter "Boolean Retire" in the post-update test patterns, a default value "true" is set for all of the post-update test patterns.

Examples of Inheritance of Test Patterns for Fourth Method

The fourth method 111d in the pre-update test class 111 is selected as an object from which the fourth method 112d in the post-update test class 112 inherits information. The test pattern group 151d for the fourth method 111d before the update is illustrated in FIG. 13.

At this time, the fourth method 111d before the update and the fourth method 112d after the update are compared.

FIG. 32 is a diagram illustrating details of correction of the fourth method. As illustrated in FIG. 32, the method return value is changed from "EmployeeData" to "EmployeeData [ ]," and the method parameters are changed from "String EmployeeName,int code" to "String EmployeeName,int section."

FIG. 33 is a diagram illustrating a comparison result for each attribute of the fourth method. As illustrated in FIG. 33, the method return value and the method parameters are changed, and the method name and the other attribute are not changed.

As in the case where a mismatch occurs in only parameters, determinations are made with respect to the parameter name and the parameter type, and an object which is to be inherited is determined for each parameter.

(Sixth Determination)

According to the sixth determination, inheritance of a parameter is performed when a match occurs in each of the parameter name and the parameter type. In the example illustrated in FIG. 33, "String EmployeeName" is not changed by the update, and a match occurs in each of the parameter name and the parameter type. Therefore, values corresponding to "String EmployeeName" in the pre-update test patterns are inherited, as they are, by the post-update test patterns.

(Seventh Determination)

When the result of the sixth determination is no, and a match of the parameter name occurs, inheritable data is inherited. However, in the example illustrated in FIG. 33, no parameter is applicable.

(Eighth Determination)

When the result of the seventh determination is no, and a match of the parameter type occurs, a parameter of the matching parameter type is inherited. In the example of FIG. 33, values corresponding to the parameter "mint code" in the pre-update test patterns are inherited by the parameter "int section" in the post-update test patterns.

FIG. 34 is a diagram illustrating examples of test patterns for the fourth method after the update. In the test pattern group 152d for the fourth method after the update illustrated in FIG. 34, the method names of the test patterns are not shown. In addition, for easy understanding of a determination result obtained by comparison of parameters, parameters before the update, parameters after the update, and comparison results are indicated.

The values of the parameter "String EmployeeName" in the pre-update test patterns are inherited, as they are, by the parameter "String EmployeeName" in the post-update test patterns. The values of the parameter "int Code" in the pre-update test patterns are inherited, as they are, by the parameter "int Section" in the post-update test patterns. The method return values in the respective post-update test patterns are default values (i.e., initial values which are preset).

Examples of Inheritance of Test Patterns for Fifth Method

The fifth method 111e in the pre-update test class 111 is selected as an object from which the fifth method 112e in the post-update test class 112 inherits information. The test pattern group 151e for the fifth method 111e before the update is illustrated in FIG. 14.

At this time, the fifth method 111e before the update and the fifth method 112e after the update are compared.

Figure 35:
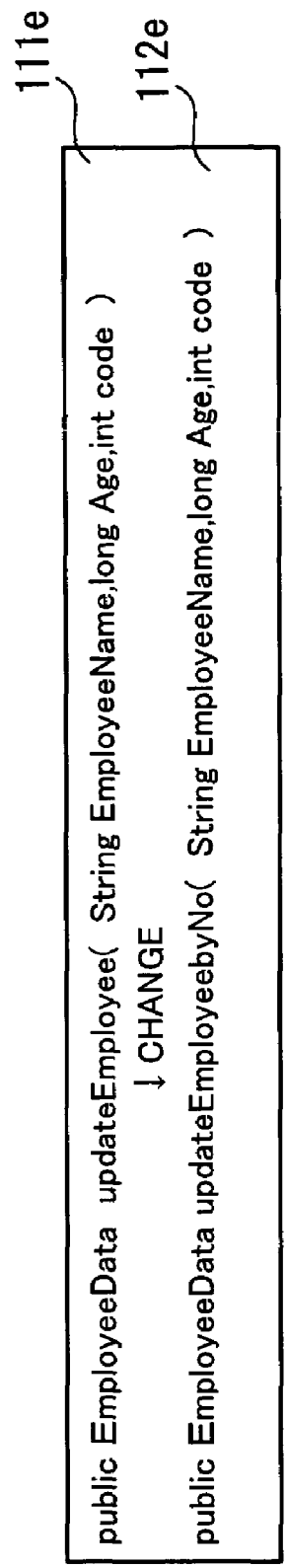
FIG. 35 is a diagram illustrating details of correction of the fifth method.

FIG. 35 is a diagram illustrating details of correction of the fifth method. As illustrated in FIG. 35, the method name is changed from "updateEmployee" to "updateEmployeebyNo."

FIG. 36 is a diagram illustrating a comparison result for each attribute of the fifth method. As illustrated in FIG. 36, only the method name is changed, and the method parameters, the method return value, and the other attribute are not changed.

In this case, a pre-update method which has a matching parameter is searched for. Then, the third method 111c before the update and the fifth method 111e before the update are detected. When there are N records each having a matching attribute (where N is an integer greater than one) as above, a method the name of which includes the greatest matching character string is determined to be an object from which inheritance is performed. In the example of FIG. 36, the fifth method 111e is determined to be an object from which inheritance is performed. Therefore, values of the attributes in the test patterns (illustrated in FIG. 14) which have been set for the fifth method 111e before the update are inherited by test patterns for the fifth method 112e after the update. In addition, the fifth method 111e before the update and the fifth method 112e after the update are identical in the method return value. Therefore, values of the return values in the test patterns for the fifth method 111e before the update are inherited by the test patterns for the fifth method 112e after the update.

FIG. 37 is a diagram illustrating examples of test patterns for the fifth method after the update. In the test pattern group 152e for the fifth method after the update illustrated in FIG. 37, parameters before the update, parameters after the update, and comparison results are indicated for easy understanding of a determination result obtained by comparison of parameters. As illustrated in FIG. 37, the parameters and the return value in the pre-update test patterns are inherited, and only the method name is changed in the test patterns for the fifth method 112e after the update.

Manual Operation and Screen Display

As explained above, it is possible to automatically generate test patterns for testing the post-update test class 112 by using test patterns which are prepared for testing the pre-update test class 111. At this time, test patterns for each post-update method included in the post-update test class 112 can be automatically generated only when there is a pre-update method from which the post-update method can inherit information. When there is no pre-update method from which a post-update method included in the post-update test class 112 can inherit information, information for the post-update method may be set by using the manual inheritance unit 190. That is, in response to a manual input by an operator, the manual inheritance unit 190 makes the post-update method inherit test patterns which have been set for a pre-update method.

In the present embodiment, a GUI (graphic user interface) provides a manual-input screen. By using the manual-input screen, a pre-update method, as an object from which test patterns is to be inherited by a post-update method, is brought into correspondence with the post-update method.

FIG. 38 is a diagram illustrating an example of a screen for designating a method to be inherited. As illustrated in FIG. 38, the inherited-method designation screen 200 includes a post-update method-information display area 210, a pre-update method-information display area 220, an uninherited-method-list display area 230, an up button 201, a down button 202, a delete button 203, an addition button 204, an OK button 205, a cancel button 206, and a help button 207.

The post-update method-information display area 210 is a display area for displaying a list of method information items after an update. Specifically, class names and method names after an update are displayed in the post-update method-information display area 210.

The pre-update method-information display area 220 is a display area for displaying a list of (pre-update method) information items on at least one of pre-update methods which is selected to be updated. Specifically, class names, method names, file names (of files in which test patterns are registered), and the like after the update are displayed in the pre-update method-information display area 220.

The method information items displayed side by side (in line) in the post-update method-information display area 210 and the pre-update method-information display area 220 are associated with each other. Inheritance of test patterns is performed between the method information items associated with each other. In addition, when no pre-update method from which information is inherited by a post-update method is selected, fields in the line corresponding to the post-update method in the pre-update method-information display area 220 are blank. Further, it is possible to change correspondence between pre-update method information items and post-update method information items by changing a registration location of a pre-update method information item in the pre-update method-information display area 220.

The uninherited-method-list display area 230 is a display area for displaying a list of at least one (pre-update method) information item indicating at least one of the pre-update methods which is not selected to be updated, i.e., at least one (pre-update method) information item indicating at least one pre-update method not having a candidate which inherits information from the at least one pre-update method. When one of the at least one pre-update method information item is selected, and moved to a blank line in the pre-update method-information display area 220, the one of the at least one pre-update method information item can be brought into correspondence with a post-update method information item which has not yet been associated with an object from which the post-update method information item can inherit information. The movement from the uninherited-method-list display area 230 to the pre-update method-information display area 220 can be designated by a mouse manipulation called drag and drop.

The up button 201 is a button for moving upward a registration location of a pre-update method information item selected in the pre-update method-information display area 220. When the up button 201 is pressed, the location of the pre-update method information item selected in the pre-update method-information display area 220 is moved one row up. At this time, the location of a pre-update method information item which has been registered in the row to which the selected pre-update method information item is moved as above is moved one row down.

The down button 202 is a button for moving downward a registration location of a pre-update method information item selected in the pre-update method-information display area 220. When the down button 202 is pressed, the location of the pre-update method information item selected in the pre-update method-information display area 220 is moved one row down. At this time, the location of a pre-update method information item which has been registered in the row to which the selected pre-update method information item is moved as above is moved one row up.

The delete button 203 is a button for deleting a registration of a pre-update method information item selected in the pre-update method-information display area 220. When the delete button 203 is pressed, the registration of the pre-update method information item selected in the pre-update method-information display area 220 is deleted from the pre-update method-information display area 220. At this time, the pre-update method information item deleted from the pre-update method-information display area 220 is set in the uninherited-method-list display area 230.

The addition button 204 is a button for inserting a pre-update method information item selected in the uninherited-method-list display area 230, in a row selected in the pre-update method-information display area 220. When the addition button 204 is pressed, the pre-update method information item selected in the uninherited-method-list display area 230 is inserted in the row selected in the pre-update method-information display area 220. At this time, the pre-update method information item inserted in the pre-update method-information display area 220 is removed from the uninherited-method-list display area 230.

The OK button 205 is a button for confirming information in the inherited-method designation screen 200. When the OK button 205 is pressed, information set by the manual inheritance unit 190 on the inherited-method designation screen 200 is registered in the test-pattern storage unit 150.

The cancel button 206 is a button for cancelling a change of information in the inherited-method designation screen 200. When the cancel button 206 is pressed, a manipulation performed on the inherited-method designation screen 200 is cancelled, and the inherited-method designation screen 200 is closed.

The help button 207 is a button for displaying a help screen which provides guidance on how to manipulate the system. When the help button 207 is pressed, a manipulation made on the inherited-method designation screen 200 is cancelled, and the help screen is displayed.

As explained above, in order to confirm a result of automatic inheritance and support manual inheritance of information which has not been inherited, the GUI which enables an operator to select an object from which information is to be inherited is provided. Thus, even when there is no pre-update method from which information can be automatically inherited, it is possible to set a pre-update method as an object from which information is to be inherited, by a simple manipulation. When a pre-update method as an object from which information is to be inherited is designated, test patterns for the method can be inherited as test patterns for a post-update method.

Further, in the present embodiment, it is possible to easily confirm details of a result of automatic inheritance of test patterns on a screen.

FIG. 39 is a diagram illustrating an example of a screen for confirming a result of inheritance of test patterns. The result confirmation screen 300 in FIG. 39 is provided for confirming a result of inheritance of test patterns, and includes a detail-of-test-pattern display area 310 and a parameter display area 320.

The detail-of-test-pattern display area 310 is a display area for displaying details of test patterns for each method. Specifically, various information such as a test-pattern number, details of the test, and normality/abnormality is displayed for each test pattern in the detail-of-test-pattern display area 310.

The parameter display area 320 is a display area for displaying parameters of each test pattern. Specifically, a parameter name, an attribute, a value, and the like of each parameter are displayed in the parameter display area 320, where automatically generated values are highlighted, e.g., displayed in a color different from a color in which the other values are displayed. In the example of FIG. 39, the value "10" of the parameter "param1" is highlighted.

When a value automatically generated in the processing for inheritance of test patterns is highlighted, it is possible to prompt the operator to confirm the automatically generated value. Then, the operator confirms details of the highlighted item, and determines whether or not the value is appropriate. When another value is more appropriate, it is possible to change the value of the parameter by changing the value displayed in the parameter display area 320.

As explained above, in the present embodiment, when a function (method) in a class to be tested is changed, test patterns for a post-update method can inherit test patterns which have already designed.

In addition, attention is focused on attributes (method names, method parameters, method return values, and the like) of interfaces of functions (methods), and a pre-update method is automatically brought into correspondence with a post-update method in accordance with a rule relating to priority of matching attributes, so that test patterns are automatically inherited. Thus, it is possible to inherit more appropriate test patterns.

Further, a GUI is provided, and enables manual designation of an object from which information is to be inherited, when there is no candidate for an object from which information is automatically inherited. Therefore, it is possible to easily manipulate the system so as to designate an object from which information is to be inherited.

Furthermore, since a GUI is provided, and enables notification to a user of an automatically inherited portion of information, the user can easily confirm whether or not the automatic inheritance is appropriate.

Moreover, since a default value (initial value) of a mismatching method parameter, of which automatic inheritance is not to be performed, is automatically set, automatically inherited test patterns can be utilized, as they are, in an operational test of a post-update program.

At this time, at least one parameter for which at least one default value is set is highlighted, it is possible to easily recognize the at least one parameter, and easily change the at least one value of the at least one parameter to at least one more appropriate other value.

Others

The above processing functions can be realized by a computer. In this case, a test support program which describes details of processing for realizing the functions which the test support apparatus should have is provided. When the computer executes the program, the above processing functions can be realized on the computer.

The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer which is connected to a network, and transfer the program to another computer connected to the network.

The computer which executes the program stores the program in a storage device belonging to the computer, where the program is originally recorded in, for example, a portable recording medium. The computer reads the program from the storage device, and performs processing in accordance with the program. Alternatively, the computer may directly read the program from the portable recording medium for performing processing in accordance with the program. Further, the computer can sequentially execute processing in accordance with each portion of the program every time the portion of the program is transferred from the server computer.

As explained above, according to the present invention, post-update test patterns corresponding to a post-update operation description are generated by inheriting information in pre-update test patterns which are set for a pre-update operation description having high commonality with the post-update operation description. Therefore, even when a program under development is updated, it is unnecessary to produce test patterns from the beginning, and production of the test patterns becomes easy.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer readable medium storing a test support program executed by a computer for performing an operational test of a program under development by using test patterns each of which includes a parameter to be inputted to a function defined in the program under development and a return value to be outputted from the function, said test support program makes said computer perform processing comprising:

(a) acquiring a post-update operation description which defines details of an operation of a function included in said program under development after an update when said program under development undergoes the update;

(b) selecting a pre-update operation description which has high commonality with said post-update operation description acquired in (a), from among a plurality of pre-update operation descriptions defining details of operations of functions included in said program under development before the update;

(c) extracting a pre-update test pattern for an operational test of said pre-update operation description selected in (b), from among a plurality of pre-update test patterns prepared for operational tests of the program under development before the update; and (d) generating a post-update test pattern for an operational test of said post-update operation description acquired in (a), by inheriting at least a portion of said pre-update test pattern extracted in (c).

2. The computer readable medium according to claim 1, wherein one of said plurality of pre-update operation descriptions which is identical to said post-update operation description acquired in (a) in at least one of a plurality of predesignated attribute information items is selected in (b) as said pre-update operation description.

3. The computer readable medium according to claim 2, wherein priorities are assigned to said plurality of predesignated attribute information items, and one of said plurality of pre-update operation descriptions which is identical to said post-update operation description acquired in (a) in a portion of the plurality of predesignated attribute information items having high priority is preferentially selected in (b) as said pre-update operation description.

4. The computer readable medium according to claim 2, wherein said plurality of predesignated attribute information items include a function name specifying a function, a type of a parameter to be inputted to the function, a type of a return value to be outputted from the function after the function is executed.

5. The computer readable medium according to claim 1, wherein information to be inherited in (d) from said pre-update test pattern extracted in (c) is determined according to at least one attribute information item which is common to said post-update operation description acquired in (a) and said pre-update operation description selected in (b).

6. The computer readable medium according to claim 5, wherein said plurality of predesignated attribute information items include a function name specifying a function, a type of a parameter to be inputted to the function, a type of a return value to be outputted from the function after the function is executed, and data corresponding to the at least one attribute information item common to said post-update operation description acquired in (a) and said pre-update operation description selected in (b), other than the function name, is inherited from said pre-update test pattern extracted in (c).

7. The computer readable medium according to claim 1, wherein said processing further comprises automatically generating information as at least a portion of said post-update test pattern which does not inherit from said pre-update test pattern extracted in (c).

8. The computer readable medium according to claim 7, wherein said processing further comprises displaying details of said post-update test pattern, and highlighting said information which is automatically generated.

9. The computer readable medium according to claim 1, wherein said processing further comprises selecting one of said plurality of pre-update operation descriptions based on designation by a manipulation input, when none of the plurality of pre-update operation descriptions has high commonality with said post-update operation description acquired in (a).

10. The computer readable medium according to claim 9, wherein said processing further comprises
    displaying a list of at least one of said plurality of pre-update operation descriptions which has not been selected, and
    selecting one of the at least one of said plurality of pre-update operation descriptions which is designated by a manipulation input.

11. A computer readable medium storing a test support program executed by a computer for performing an operational test of an object-oriented program under development by using test patterns each of which includes a parameter to be inputted to a function defined in the object-oriented program and a return value to be outputted from the function, said test support program makes said computer perform processing comprising:
    (a) acquiring a post-update method information item which defines details of an operation of a function included in said object-oriented program after an update, when said object-oriented program undergoes the update;
    (b) selecting a pre-update method information item which has high commonality with said post-update method information item acquired in (a), from among a plurality of pre-update method information items defining details of operations of functions included in said object-oriented program before the update;
    (c) extracting a pre-update test pattern for an operational test of said pre-update method information item selected in (b), from among a plurality of pre-update test patterns prepared for operational tests of the object-oriented program before the update; and
    (d) generating a post-update test pattern for an operational test of said post-update method information item acquired in (a), by inheriting at least a portion of said pre-update test pattern extracted in (c).

12. A computer readable medium storing a test support process for performing an operational test of a program under development by using test patterns each of which includes a parameter to be inputted to a function defined in the program and a return value to be outputted from the function, said test support process comprising:
    (a) acquiring a post-update operation description which defines details of an operation of a function included in said program after an update, when said program undergoes the update;
    (b) selecting a pre-update operation description which has high commonality with said post-update operation description acquired in (a), from among a plurality of pre-update operation descriptions defining details of operations of functions included in said program before the update;
    (c) extracting a pre-update test pattern for an operational test of said pre-update operation description selected in (b), from among a plurality of pre-update test patterns prepared for operational tests of the program before the update; and
    (d) generating a post-update test pattern for an operational test of said post-update operation description acquired in (a), by inheriting at least a portion of said pre-update test pattern extracted in (c).

13. A test support apparatus for performing an operational test of a program under development by using test patterns each of which includes a parameter to be inputted to a function defined in the program and a return value to be outputted from the function, said test support apparatus comprising:
    a post-update operation-description acquisition unit which acquires a post-update operation description which defines details of an operation of a function included in said program after an update, when said program undergoes the update;
    a pre-update operation-description storage unit which stores a plurality of pre-update operation descriptions defining details of operations of functions included in said program before the update;
    a pre-update operation-description selection unit which selects a pre-update operation description which has high commonality with said post-update operation description acquired by said post-update operation-description acquisition unit, from among said plurality of pre-update operation descriptions stored in said pre-update operation-description storage unit;
    a pre-update test-pattern storage unit which stores a plurality of pre-update test patterns prepared for operational tests of the program before the update;
    a pre-update test-pattern extraction unit which extracts a pre-update test pattern for an operational test of said pre-update operation description selected by said pre-update operation-description selection unit, from among said plurality of pre-update test patterns stored in said pre-update test-pattern storage unit; and
    a post-update test-pattern generation unit which generates a post-update test pattern for an operational test of said post-update operation description acquired by said post-update operation-description acquisition unit, by inheriting at least a portion of said pre-update test pattern extracted by said pre-update test-pattern extraction unit.

* * * * *